US011982408B2

(12) United States Patent
Newman et al.

(10) Patent No.: US 11,982,408 B2
(45) Date of Patent: May 14, 2024

(54) QUICK-FILL APPARATUS, SYSTEM AND METHOD FOR FUEL VALVES

(71) Applicant: YSN Imports, LLC, Pico Rivera, CA (US)

(72) Inventors: Shmuel Dovid Newman, Los Angeles, CA (US); Jeff Brown, North Logan, UT (US)

(73) Assignee: YSN Imports, LLC, Pico Rivera, CA (US)

(*) Notice: Subject to any disclaimer, the term of this patent is extended or adjusted under 35 U.S.C. 154(b) by 0 days.

(21) Appl. No.: 18/019,371

(22) PCT Filed: Aug. 31, 2021

(86) PCT No.: PCT/US2021/048509
§ 371 (c)(1),
(2) Date: Feb. 2, 2023

(87) PCT Pub. No.: WO2022/047409
PCT Pub. Date: Mar. 3, 2022

(65) Prior Publication Data

US 2023/0258301 A1 Aug. 17, 2023

Related U.S. Application Data

(60) Provisional application No. 63/072,713, filed on Aug. 31, 2020.

(51) Int. Cl.
*F17C 7/02* (2006.01)

(52) U.S. Cl.
CPC ........ *F17C 7/02* (2013.01); *F17C 2205/0323* (2013.01); *F17C 2205/0376* (2013.01); *F17C 2221/033* (2013.01); *F17C 2223/0153* (2013.01)

(58) Field of Classification Search
CPC .......................... F17C 7/02; F17C 2205/0376
See application file for complete search history.

(56) References Cited

U.S. PATENT DOCUMENTS

| | | | | |
|---|---|---|---|---|
| 3,205,923 | A | 9/1965 | Wilson | |
| 2009/0223580 | A1 | 9/2009 | Denis et al. | |
| 2011/0114208 | A1 | 5/2011 | Newman et al. | |
| 2012/0192576 | A1* | 8/2012 | Carrubba ............... | F25B 45/00 62/149 |
| 2014/0326328 | A1 | 11/2014 | Newman | |
| 2018/0045373 | A1 | 2/2018 | Frenal | |
| 2018/0087688 | A1 | 3/2018 | Frenal et al. | |
| 2019/0032789 | A1 | 1/2019 | Newman et al. | |
| 2019/0105438 | A1 | 4/2019 | Mack et al. | |

* cited by examiner

*Primary Examiner* — Paul J Gray
(74) *Attorney, Agent, or Firm* — Lance M. Pritikin

(57) ABSTRACT

A quick-fill apparatus for use with a valve assembly, and related methods of filling a pressure vessel, are disclosed. A valve assembly may be affixed to a pressure vessel, and may include a receptacle, a fill valve and an overfill valve. Preferred examples of the apparatus comprise a body, a valve trigger pin, a vent trigger pin and a handle. A valve engagement end of the body may be releasably securable within the receptacle. At that point, moving the handle to the on position causes the valve trigger pin to force the fill valve to an open configuration, and causes the vent trigger pin to force the overfill valve to a fluid venting configuration. A rigid fill tube may be in fluid supplying communication with a fuel supply port of the body. The fill tube and the handle may be elongated and extend in a shared direction.

21 Claims, 18 Drawing Sheets

QUICK-FILL APPARATUS, SYSTEM AND METHOD FOR FUEL VALVES

RELATED APPLICATIONS

This application is a U.S. national stage of PCT International Patent Application No. PCT/US2021/048509 having an international filing date of Aug. 31, 2021, which claims the benefit of U.S. Provisional Application No. 63/072,713 filed Aug. 31, 2020. All of the above-identified applications are incorporated by this reference in their entireties for all purposes as if fully set forth herein.

TECHNICAL FIELD

The present disclosure relates generally to the field of devices for the filling and venting of tanks for the storage and dispensing of propane, butane, and other gases that are typically filled into a vessel while at least primarily in the liquid state.

BACKGROUND

The process of filling certain fuel cylinders, such as 20-pound propane tanks, typically requires a fill valve and an overfill relief pathway to be open simultaneously. What is needed are devices and methods that allow a user to fill a fuel cylinder in a manner which improves the safety, speed and mechanical efficiency of the fill process.

SUMMARY

Certain deficiencies of the prior art may be overcome by the provision of a quick-fill apparatus, system and method for fuel valves in accordance with the present disclosure. The expedients described herein have particular applicability to fuel cylinder systems that use CGA 600 fittings.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
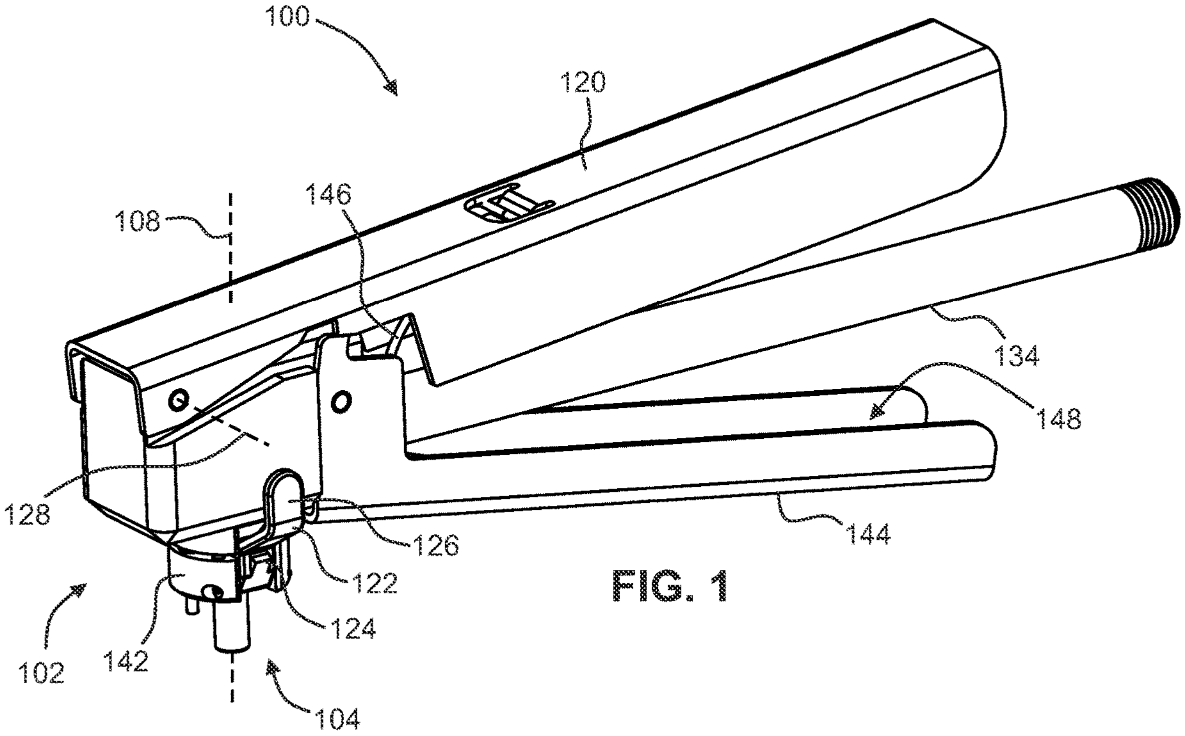
FIG. 1 is a diagrammatic perspective view of a non-limiting example quick-fill apparatus in accordance with the present disclosure.

Referring now to the drawings, like reference numerals designate identical or corresponding features throughout the several views.

Various example embodiments of a new quick-fill apparatus, system and method are illustrated and described herein. Certain preferred examples of the quick-fill apparatus are shown generally at 100, and certain preferred examples of the quick fill system are shown generally at 300. A quick-fill system 300 incorporates a quick-fill apparatus 100 and a corresponding valve assembly 200.

Figure 2:
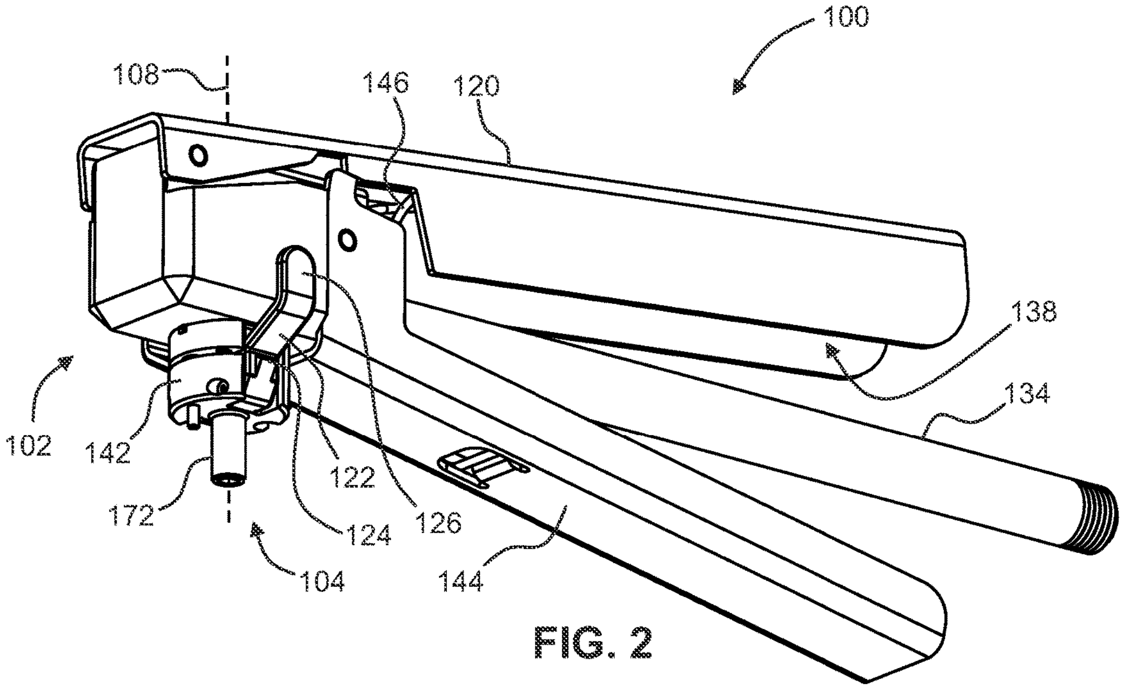
FIG. 2 is a further diagrammatic perspective view of the example quick-fill apparatus of FIG. 1.
Figures 3, 4:
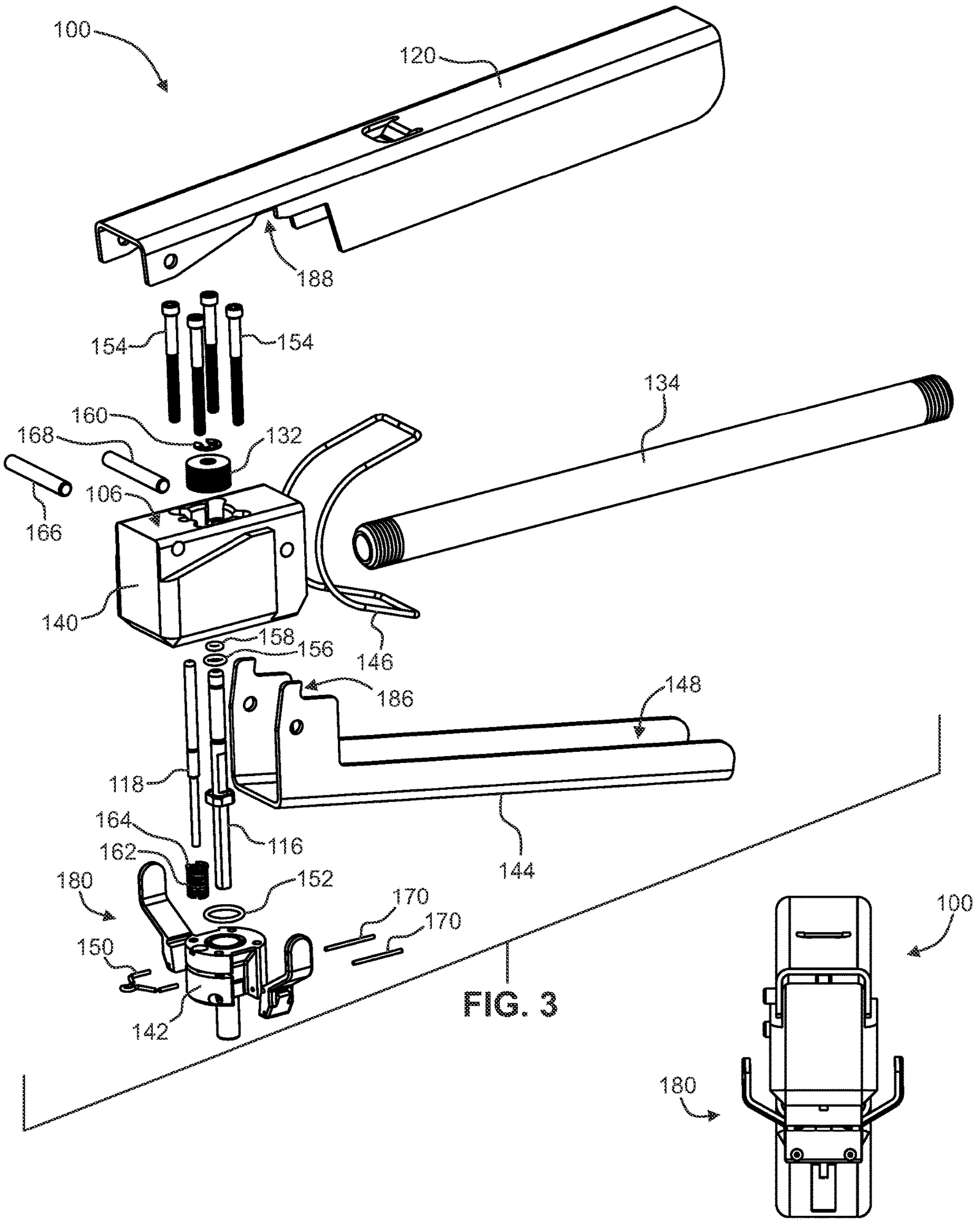
FIG. 3 is a diagrammatic exploded view of the example quick-fill apparatus of FIG. 1.
FIG. 4 is a diagrammatic front view of the example quick-fill apparatus of FIG. 1.
Figure 8:
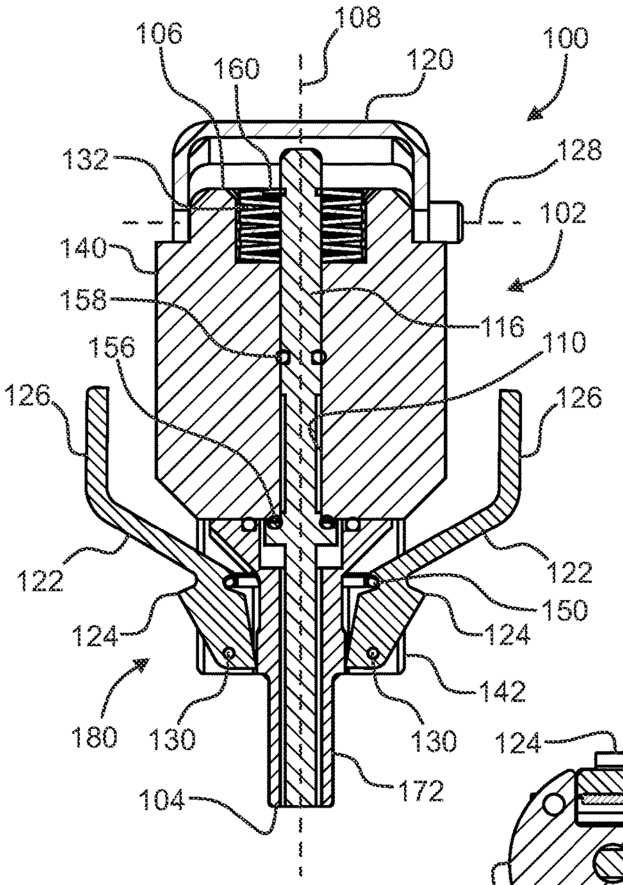
FIG. 8 is a diagrammatic cross-sectional view taken along lines 8-8 in FIG. 5, showing the valve lock elements in a lock position.
Figure 23:
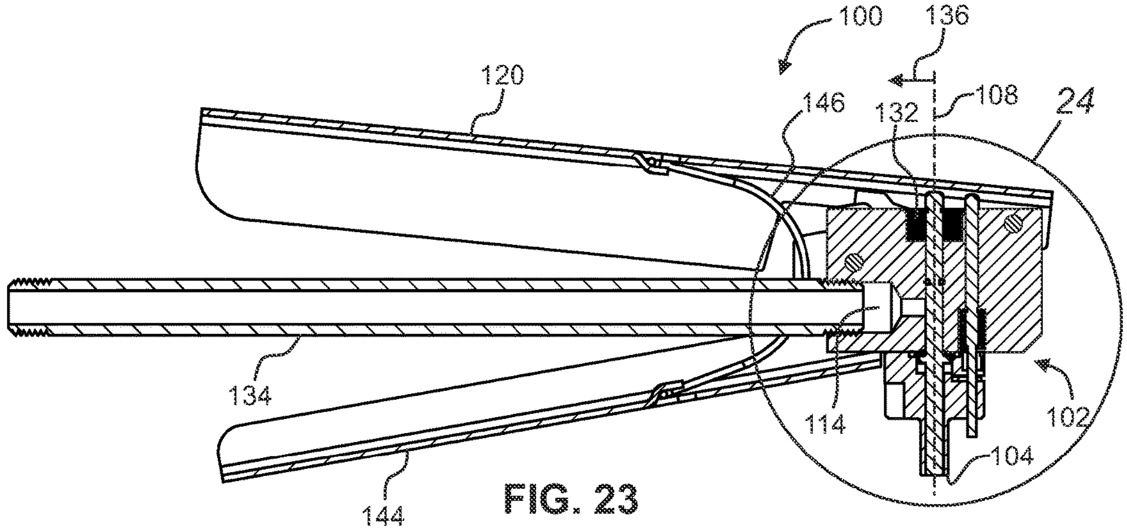
FIG. 23 is a diagrammatic cross-sectional view taken along lines 23-23 in FIG. 22.

Referring to FIGS. 1-3, a quick-fill apparatus 100 may comprise a body portion 102, a valve trigger pin 116, a vent trigger pin 118, a valve securement mechanism 180 and a handle element 120. Referring to FIGS. 8 and 23, the body portion 102 may have a valve engagement end 104, a fuel supply port 114 and a valve trigger bore 110. The valve trigger bore 110 may extend through the valve engagement end 104 along a main axis 108. The fuel supply port 114 may be in fluid communication with the valve trigger bore 110. The valve engagement end 104 may be configured to be inserted into a receptacle chamber 220 of a valve assembly 200 (see, for example, FIG. 15).

Figure 24:
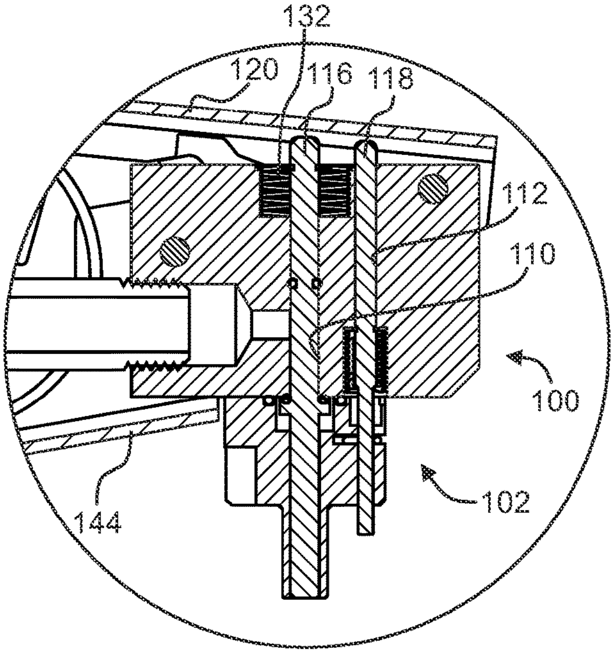
FIG. 24 is a magnified view of detail 24 in FIG. 23, showing the handle element in the off position, the valve trigger pin in the valve deactivation position and the vent trigger pin in the vent deactivation position.
Figure 25:
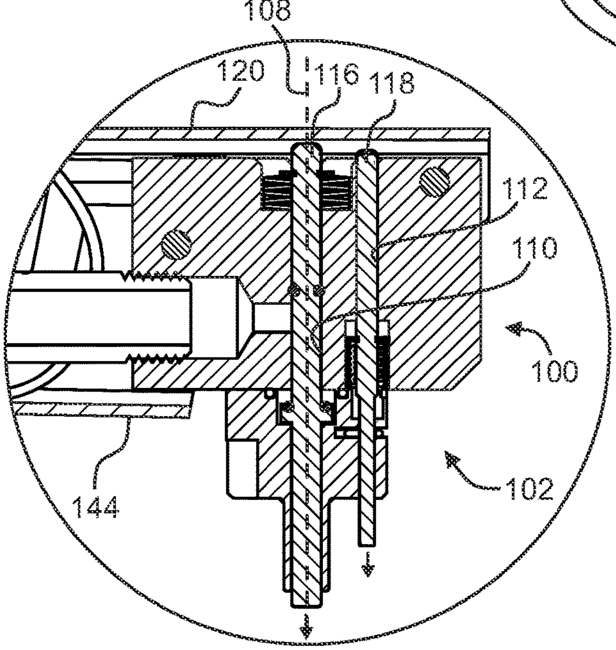
FIG. 25 is a magnified view similar to that of FIG. 24, but showing the handle element moved to its on position, thereby forcing the valve trigger pin to its valve activation position and the vent trigger pin to its vent activation position.

Referring to FIGS. 24 and 25, the valve trigger pin 116 may extend through the valve trigger bore 110 and be transportable between a valve activation position (see, for example, FIG. 25) and a valve deactivation position (see, for example, FIG. 24). The vent trigger pin 118 may be transportable between a vent activation position (see, for example, FIG. 25) and a vent deactivation position (see, for example, FIG. 24).

Figure 15:
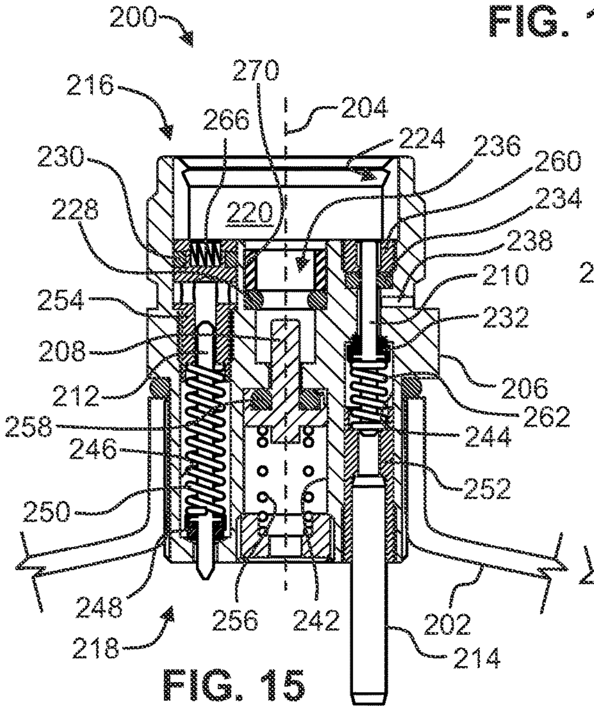
FIG. 15 is a diagrammatic cross-sectional view taken along lines 15-15 in FIG. 13.
Figure 20:
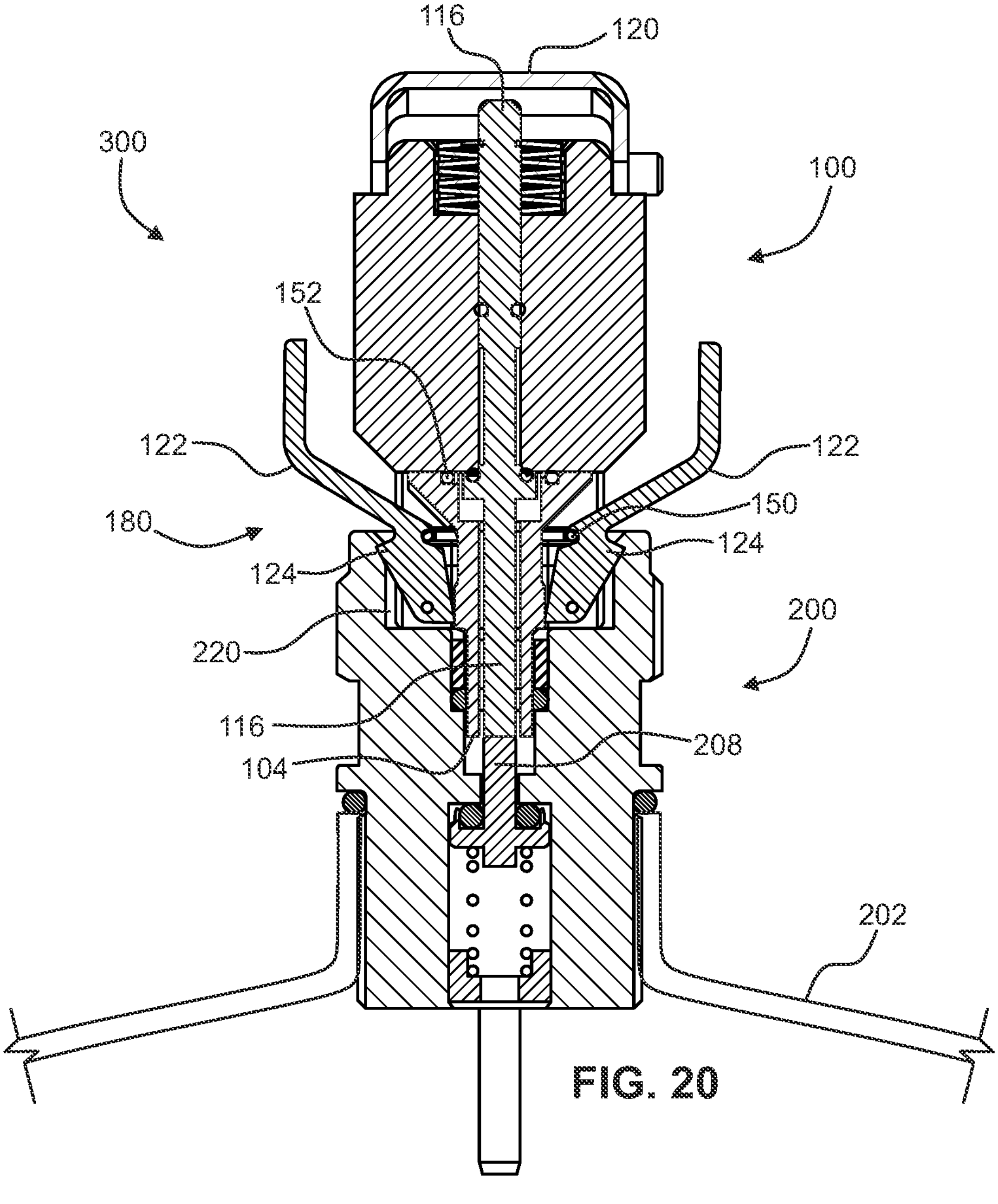
FIG. 20 is a diagrammatic cross-sectional view similar to that of FIG. 8, but wherein the quick-fill apparatus is shown attached to the valve assembly as in FIG. 19, with the lip engagement portions of the valve lock elements shown engaging a securement groove of the valve assembly receptacle chamber.
Figure 21:
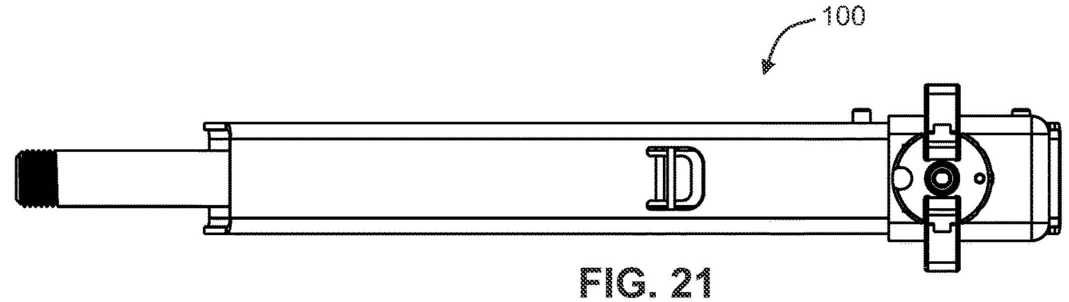
FIG. 21 is a diagrammatic bottom view of the quick-fill apparatus of FIG. 1.
Figure 22:
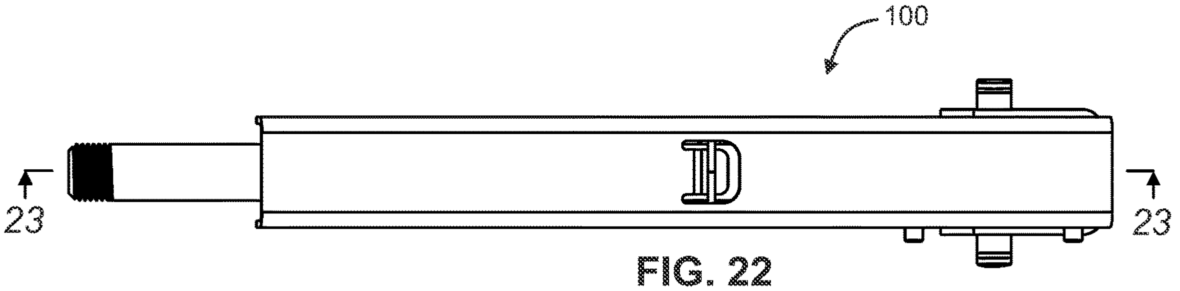
FIG. 22 is a diagrammatic top view of the quick-fill apparatus of FIG. 1.

Referring to FIGS. 15 and 20, the valve securement mechanism 180 may be configured to releasably secure the valve engagement end 104 within the receptacle chamber 220. The receptacle chamber 220 preferably includes a stem compartment 236 configured to receive a stem portion 172 of the apparatus 100 therein.

Figure 5:
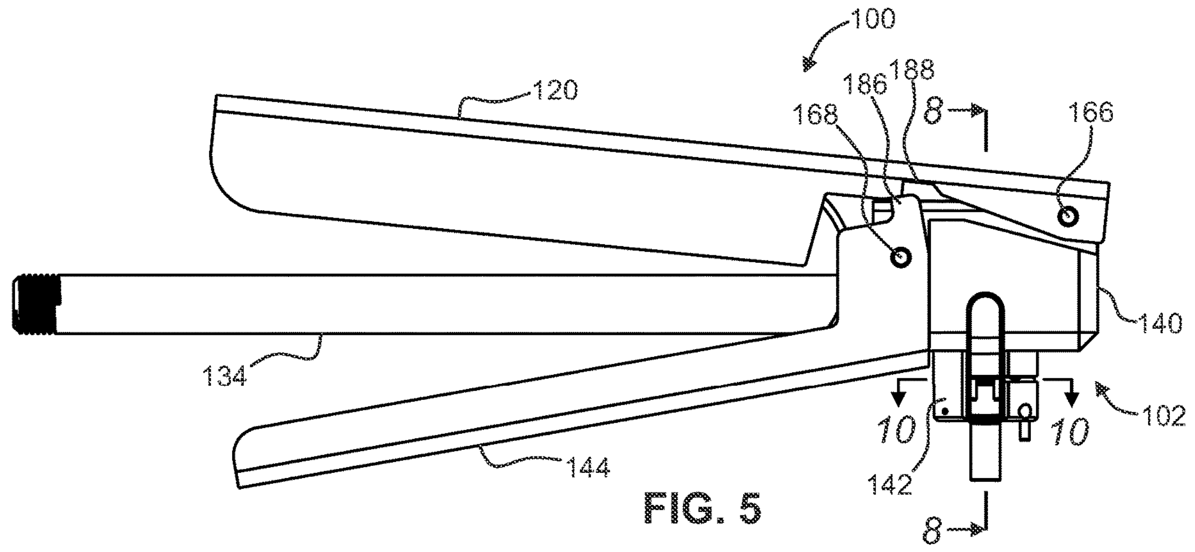
FIG. 5 is a diagrammatic side view of the example quick-fill apparatus of FIG. 1, showing the handle element in an off position and the lockout element in a handle-locking position.
Figure 7:
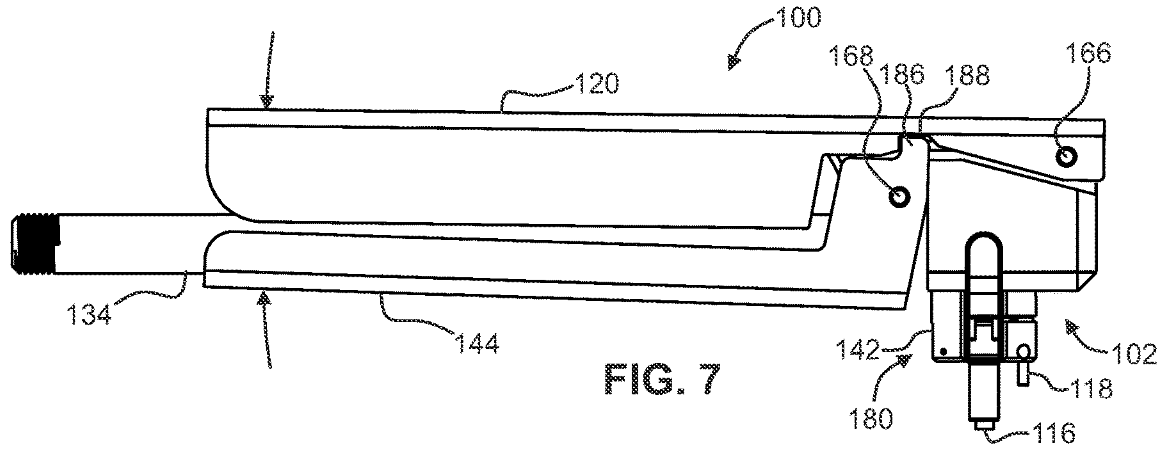
FIG. 7 is a diagrammatic side view of the example quick-fill apparatus similar to that of FIG. 6, but wherein the lockout element is shown in the handle releasing position and the handle element is shown moved to an on position.

Referring to FIGS. 5 and 7, the handle element 120 may be movable with respect to the body portion 102 between an on position (see, for example, FIG. 7) and an off position (see, for example, FIG. 5). Referring to FIG. 25, movement of the handle element 120 to the on position may be configured to force the valve trigger pin 116 to the valve activation position and the vent trigger pin 118 to the vent activation. In contrast, referring to FIG. 24, movement of the handle element 120 to the off position may be configured to allow the valve trigger pin 116 to return to the valve deactivation position and allow the vent trigger pin 118 to return to the vent deactivation position. The handle element 120 may preferably be resiliently biased toward the off position.

Referring to FIGS. 24 and 25, the body portion 102 may include a vent trigger bore 112, and the vent trigger pin 118 may extend through the vent trigger bore 112. The transportability of the valve trigger pin 116 and the vent trigger pin 118 may both be in parallel with the main axis 108. Moreover, the valve trigger bore 110 and the vent trigger bore 112 may each extend entirely through the body portion 102 in parallel with the main axis 108.

The valve trigger pin 116 may be resiliently biased toward the valve deactivation position; and the vent trigger pin 118 may be resiliently biased toward the vent deactivation position.

Figure 9:
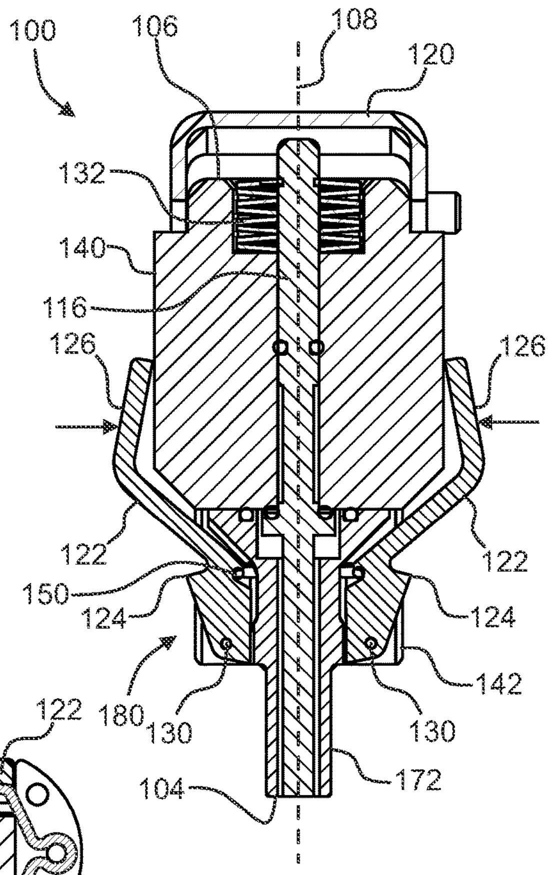
FIG. 9 is a diagrammatic cross-sectional view similar to that of FIG. 8, but wherein the valve lock elements have been moved to an unlock position.
Figure 10:
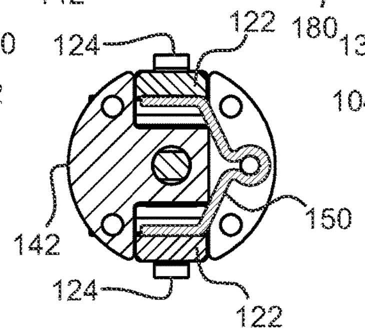
FIG. 10 is a diagrammatic cross-sectional view taken along lines 10-10 in FIG. 5, showing a lock spring elastically biasing the valve lock elements in their lock positions.
Figure 11:
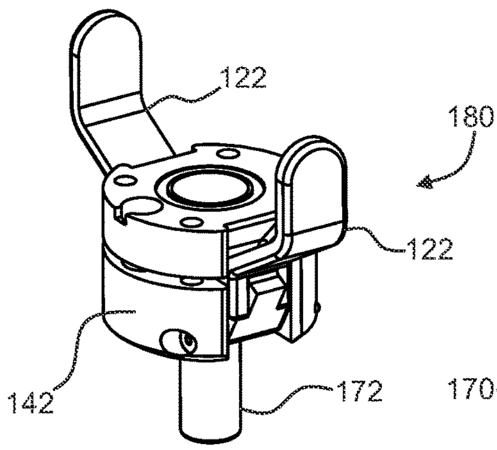
FIG. 11 is a diagrammatic perspective view of an example valve securement mechanism of the apparatus of FIG. 1, wherein a stem block retains the mutually-movable components of the securement mechanism, including valve lock elements and a lock spring.
Figure 12:
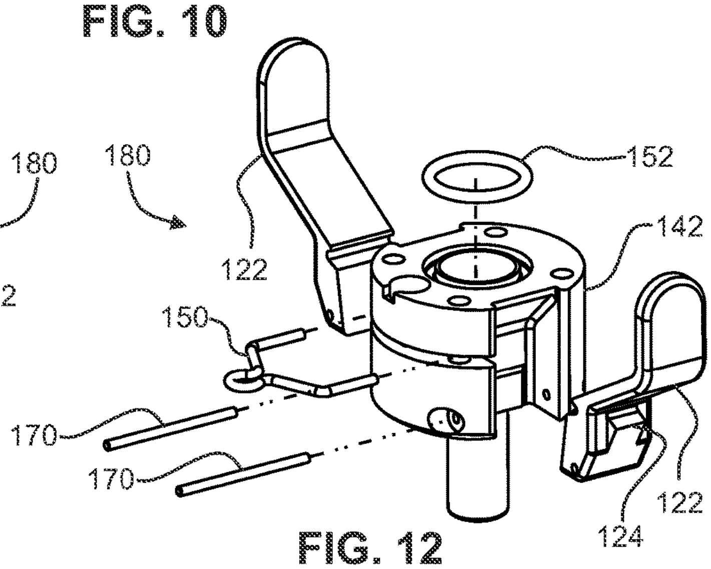
FIG. 12 is a diagrammatic exploded view of an example valve securement mechanism of the apparatus of FIG. 11.
Figure 13:
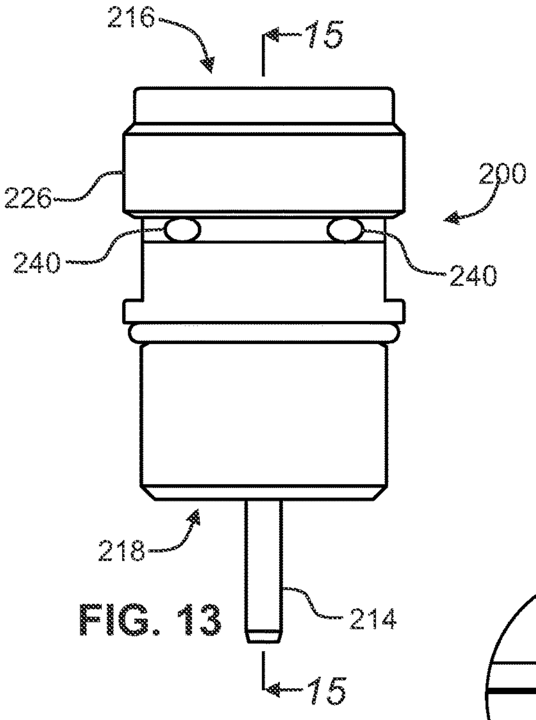
FIG. 13 is a diagrammatic front view of one non-limiting example valve assembly in accordance with the present disclosure.
Figure 14:
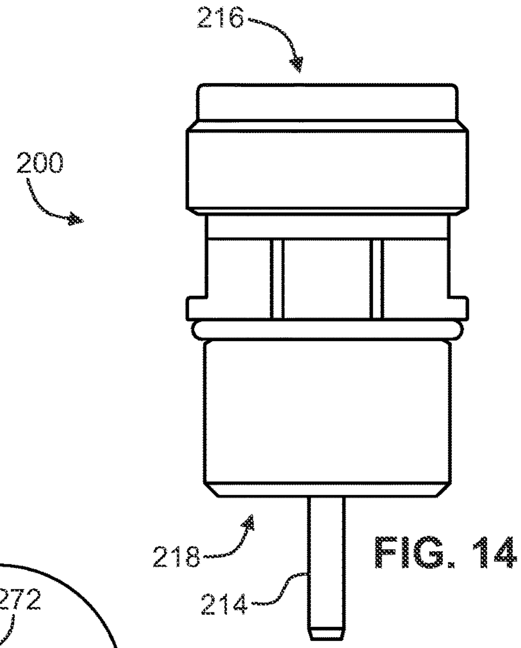
FIG. 14 is a diagrammatic rear view of the example valve assembly of FIG. 13.
Figure 17:
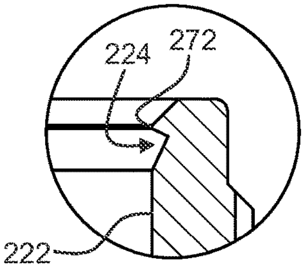
FIG. 17 is a magnified view of detail 17 in FIG. 16, illustrating one non-limiting example of a securement groove in a radially-inward-facing wall of the valve housing.
Figure 16:
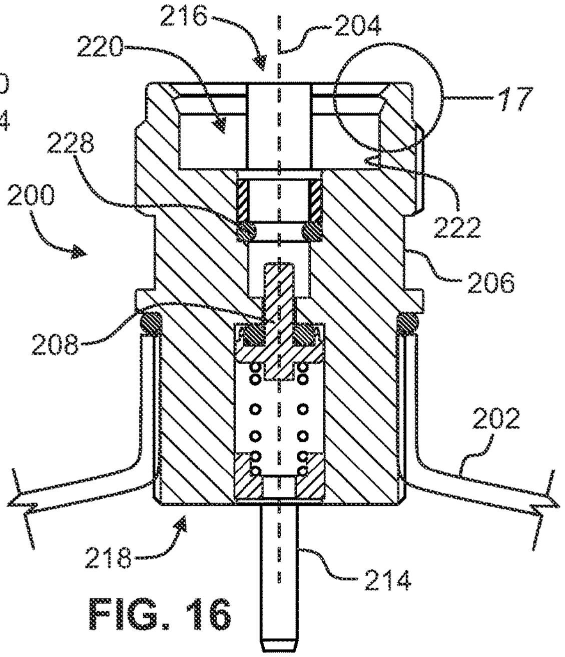
FIG. 16 is a diagrammatic cross-sectional view of the valve assembly of FIG. 13, but taken orthogonally to the view of FIG. 15.
Figure 18:
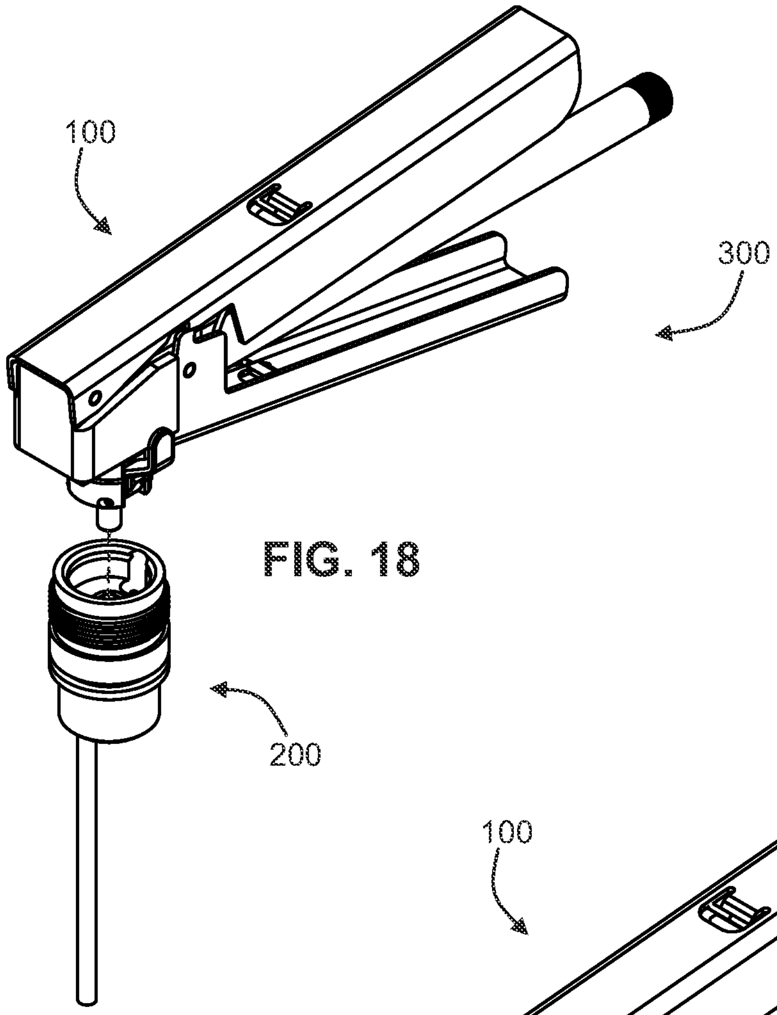
FIG. 18 is a diagrammatic perspective view of one example quick-fill system in accordance with the present disclosure, wherein the quick-fill apparatus is shown detached from a corresponding valve assembly.
Figure 19:
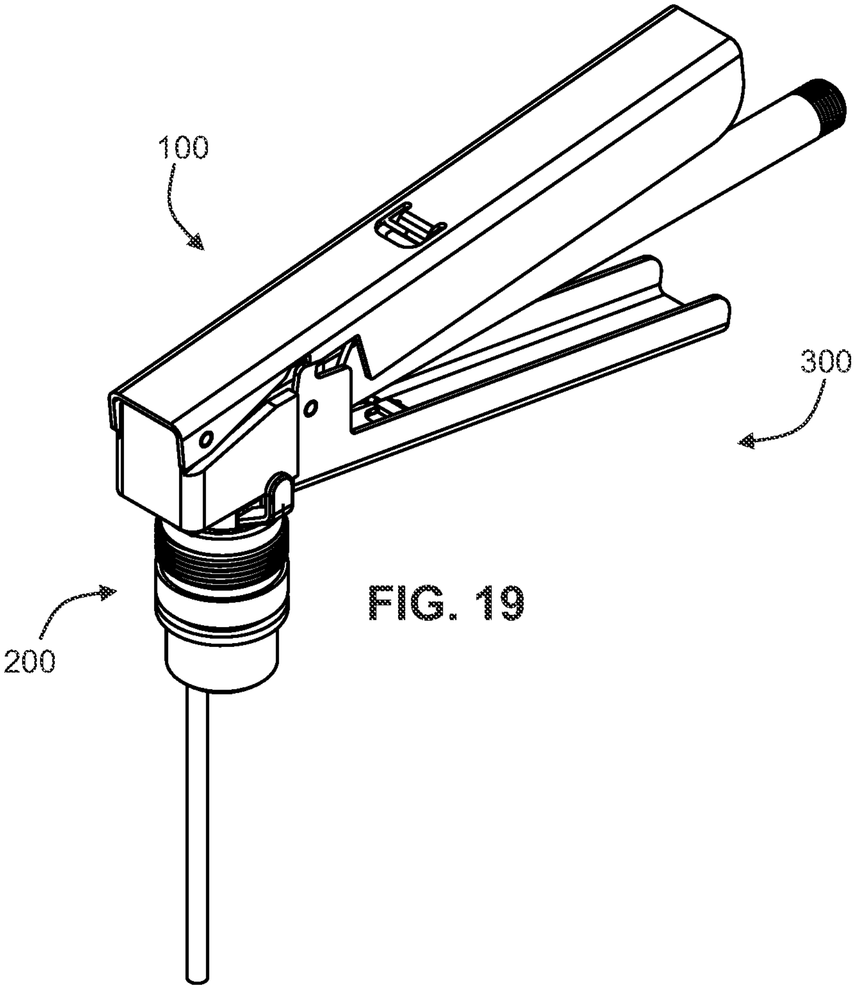
FIG. 19 is a diagrammatic perspective view similar to that of FIG. 18, but wherein the quick-fill apparatus is shown attached to the valve assembly, with the valve securement mechanism releasably securing the valve engagement end of the body portion of the apparatus within the receptacle chamber of the valve assembly.

Referring to FIG. 8, the valve securement mechanism 180 may include a first valve lock element 122 and a second valve lock element 122. Each valve lock element may have a lip engagement portion 124 and a grip portion 126, and may be actuatable with respect to the body portion 102 between a lock position and an unlock position. Each valve lock element 122 may be elastically biased toward the lock position (for example, as shown in FIG. 8). Referring to FIG. 9, actuation of the valve lock elements 112 toward the unlock position may be configured to result in movement of the lip engagement portions 124 radially inward toward the main axis 108. Referring to FIGS. 16, 17 and 20, the lip engagement portions 124 may be configured to engage a securement groove 224 disposed on a radially-inward-facing wall 222 of the receptacle chamber 220 when the valve lock elements 122 are in the lock position.

Referring to FIG. 8, the valve lock elements 122 may be laterally opposed from one another on opposite sides radially of the main axis 108. The actuatability of each valve lock element 122 may be about a lock pivot axis 130 which may be perpendicular to the main axis 108.

Referring to FIGS. 1 and 8, the movability of the handle element 120 may be about a handle pivot axis 128 which is perpendicular to the main axis 108 and the lock pivot axis 130.

Referring to FIG. 24, the valve trigger pin 116 may be resiliently biased toward the valve deactivation position, the resilient bias of the handle element 120 may be at least partially by way of the resilient bias of the valve trigger pin 116. The resilient bias of the valve trigger pin 116 may be by way of a valve trigger pin spring 132, which may be, for example, a plurality of conical disc washers (e.g., a Belville stack).

Figure 49:
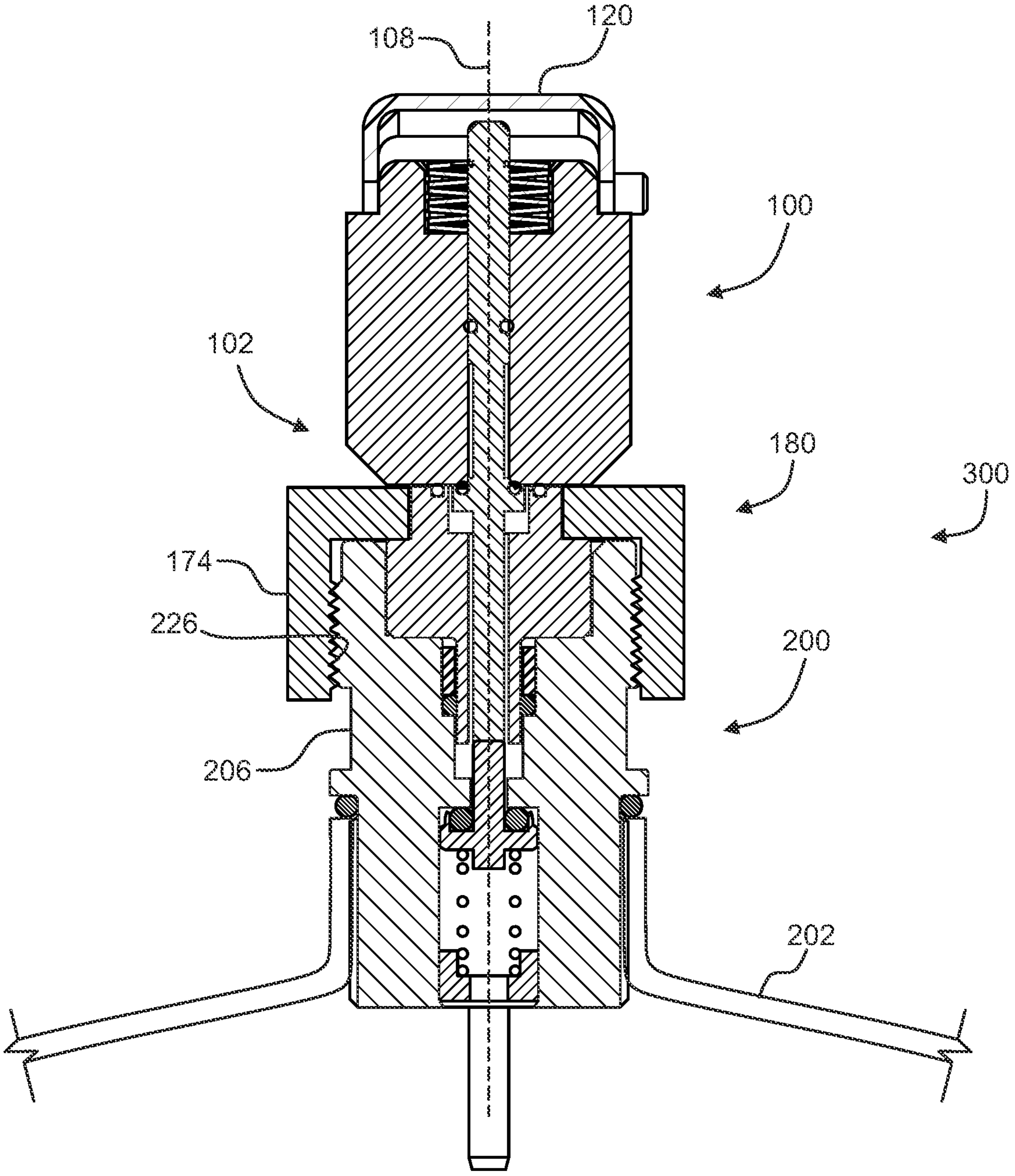
FIG. 49 is diagrammatic cross-sectional view similar to that of FIG. 20, but wherein the valve securement mechanism includes a securement sleeve configured to threadedly engage a threaded portion of a valve housing of the valve assembly.
Figure 50:
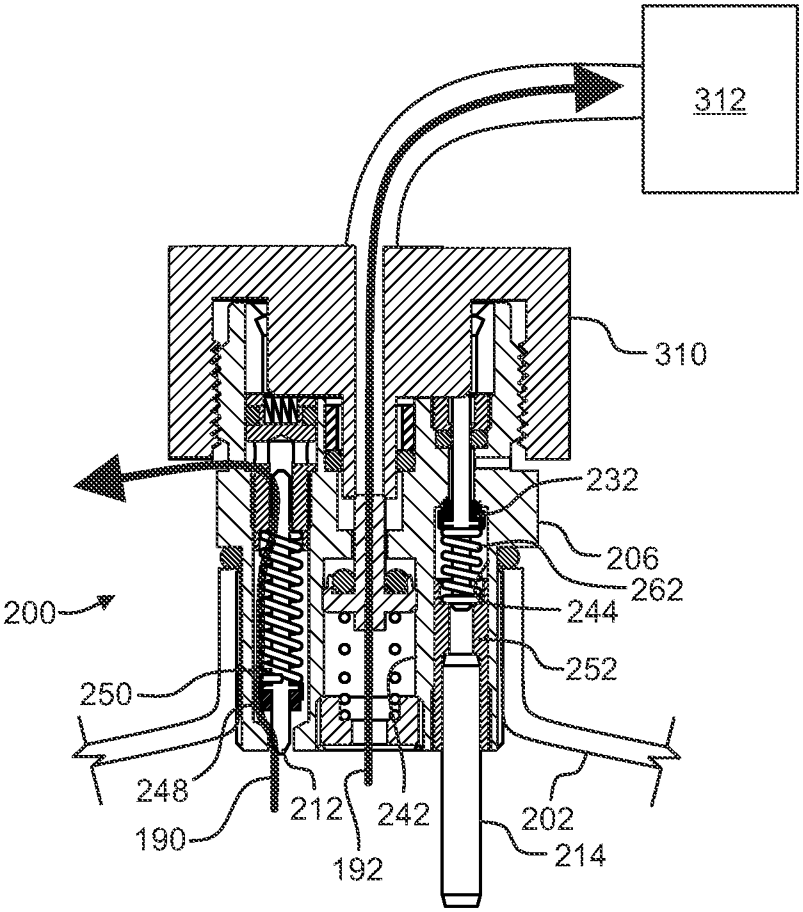
FIG. 50 is diagrammatic cross-sectional view illustrating an example valve assembly delivering fuel to a fuel consuming device by way of a valve connection adaptor, wherein overpressure gas is also shown being expelled from the pressure vessel by activation of the overpressure relief valve in the valve assembly.

Referring to FIG. 49, in particular examples of a quick-fill apparatus 100, the valve securement mechanism 180 may include a securement sleeve 174 rotatable about the main axis 108 with respect to the body portion 102. The securement sleeve 174 may be configured to threadedly engage a threaded portion 226 of a valve housing of the valve assembly 200.

Figure 26:
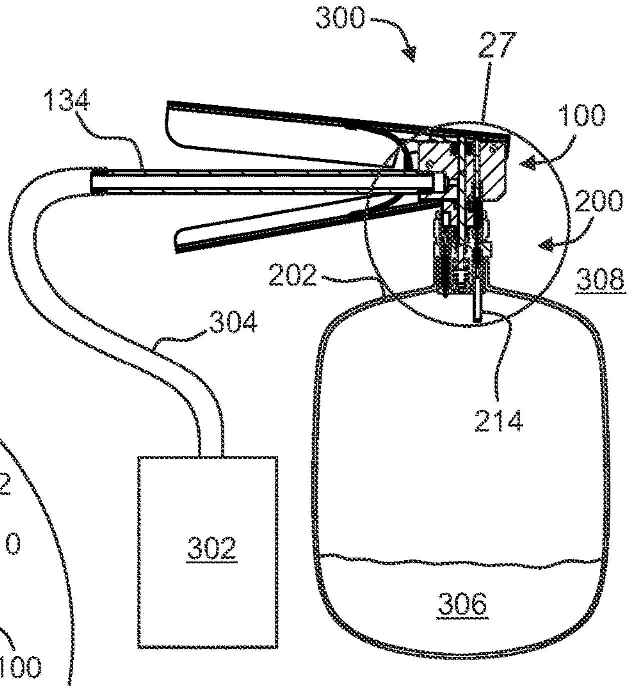
FIG. 26 is a diagrammatic cross-sectional view of one example quick-fill system in accordance with the present disclosure, wherein the quick-fill apparatus is in disposed fuel-supplying communication between a fuel supply and a valve assembly of a vessel.

Referring to FIGS. 23 and 26, particular examples of a quick-fill apparatus 100 may comprise a fill tube 134 configured to be secured in fluid supplying communication with the fuel supply port 114. The fill tube may be rigid (e.g., a rigid metal), and may have threading on opposing ends for threadedly engaging the fuel supply portion 134 and a fuel conduit 304. The fill tube 134 and the handle element 120 may be elongated and extend in a shared radial direction 136 outward of the main axis 108. Referring to FIGS. 2 and 7, the handle element 120 may include a first tube relief channel 138 configured to at least partially receive the fill tube 134 when the handle element 120 is in the on position.

Referring to FIG. 5, in particular examples of the quick-fill apparatus 100, the body portion 102 may be comprised of a porting block 140 and a stem block 142. Referring to FIG. 3, the porting block 140 and stem block 142 may be attached to one another by way of one or more block fasteners 154. The block fasteners 154 may be configured to extend through the porting block 140 and threadedly engage respective threaded apertures in the stem block 142.

Figure 6:
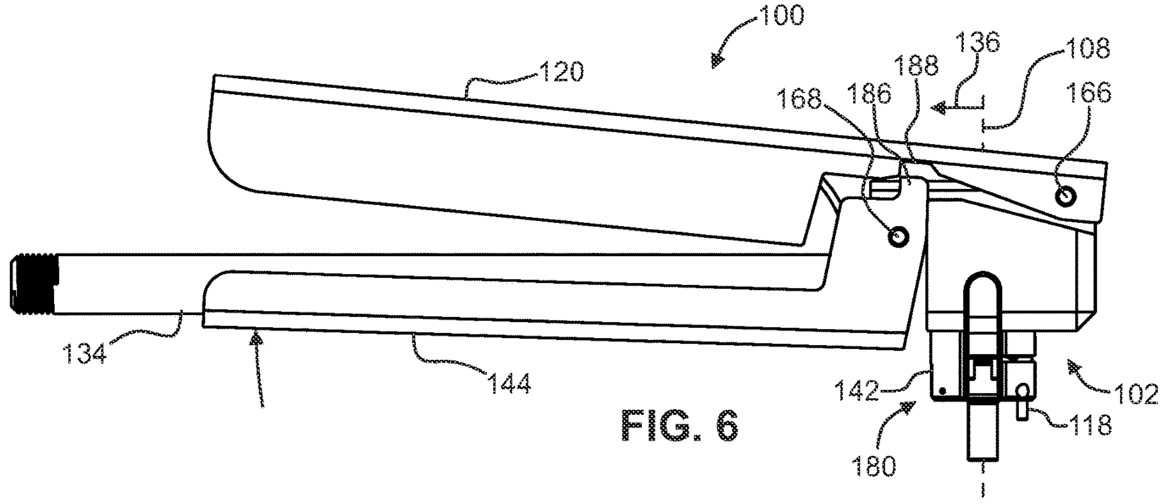
FIG. 6 is a diagrammatic side view of the example quick-fill apparatus similar to that of FIG. 5, but wherein the lockout element is shown moved to a handle releasing position.

Referring to FIGS. 5-7, certain preferred examples of the quick-fill apparatus 100 may further comprise a lockout element 144 movable between a handle locking position (shown, for example, in FIG. 5) and a handle releasing position (shown, for example, in FIGS. 6 and 7). In such examples, the handle element 120 may be configured to be moveable from the off position to the on position when the lockout element 144 is in the handle releasing position. In contrast, the handle element 120 may be configured to be prevented from moving from the off position to the on position when the lockout element 144 is in the handle locking position (as shown, for example, in FIG. 5).

Referring to FIGS. 5-7, the lockout element 144 may include a handle detent 186 and the handle element 120 may include a corresponding detent relief 188. In such case, positioning of the lockout element 144 in the handle locking position (as shown in FIG. 5, for example) places the handle detent 186 out of alignment with the detent relief 188, thereby preventing the detent relief 188 from receiving the handle detent 186 and thus preventing the handle portion 120 from moving to the on position. In contrast, referring to FIGS. 6 and 7, when the lockout element 144 is moved to the handle releasing position, the handle detent 186 becomes aligned with the detent relief 188, thereby allowing the detent relief to receive the handle detent 186 and thus allowing the handle portion 1209 to be moved to the on position. Referring to FIGS. 1 and 7, the lockout element 144 may include a second tube relief channel 148 configured to at least partially receive the fill tube 134 when the lockout element 144 is in the handle releasing position.

The lockout element 144 may be resiliently biased toward the handle locking position. Referring to FIG. 23, such resilient bias may be provided by way of a lockout spring 146. In certain examples of a quick-fill apparatus 100, the resilient bias of the lockout element 144 may be lower than the resilient bias of the handle element 120. Moreover, the resilient biases of both the lockout element 144 and the handle element 120 may be provided at least in part by a lockout spring 146 disposed therebetween.

Figure 27:
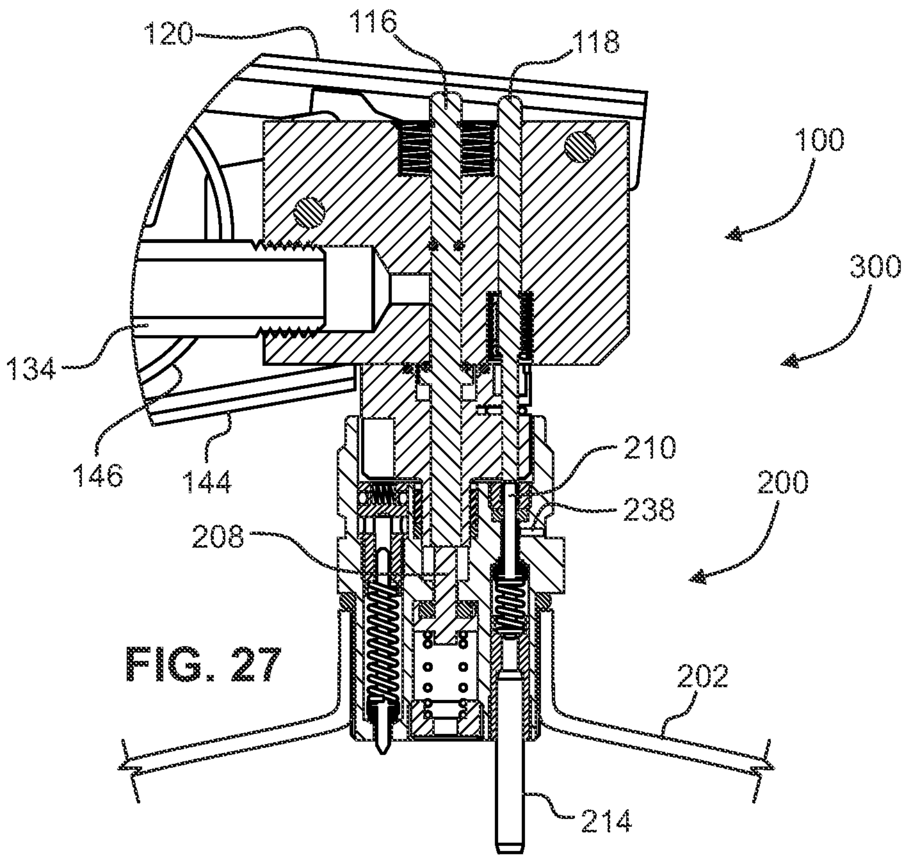
FIG. 27 is a magnified view of detail 27 in FIG. 26, showing the handle element in the off position and the valve trigger pin in the valve deactivation position and the vent trigger pin in the vent deactivation position.
Figure 28:
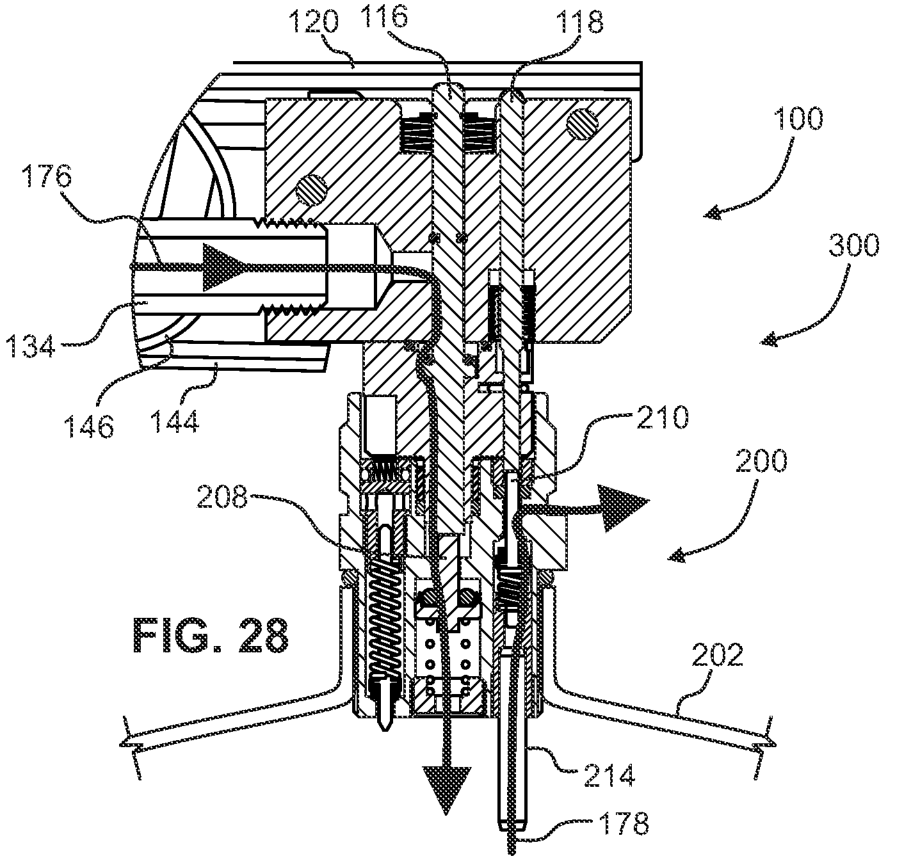
FIG. 28 is a magnified view similar to that of FIG. 27, but showing the handle element moved to its on position, thereby forcing the valve trigger pin to its valve activation position and the vent trigger pin to its vent activation position so as to allow fuel to flow into the vessel from the fuel supply.
Figure 29:
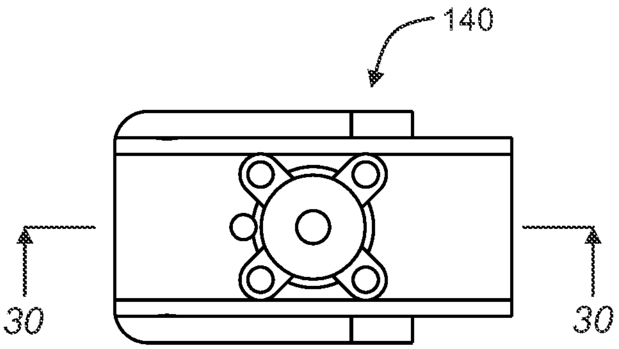
FIG. 29 is a diagrammatic top view of one example porting block in accordance with present disclosure.
Figure 31:
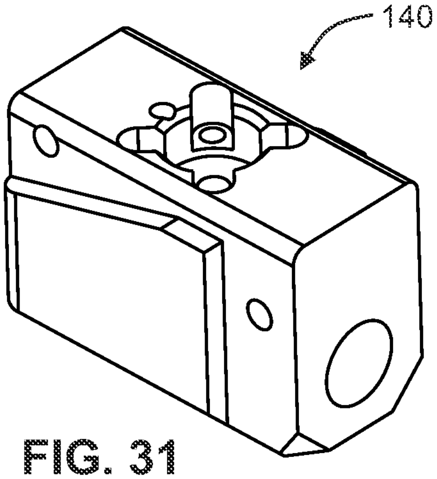
FIG. 31 is a diagrammatic perspective view of the example porting block of FIG. 29.
Figure 30:
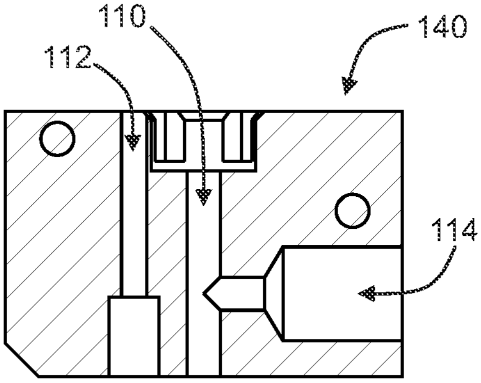
FIG. 30 is a diagrammatic cross-sectional view taken along lines 30-30 in FIG. 29.
Figure 32:
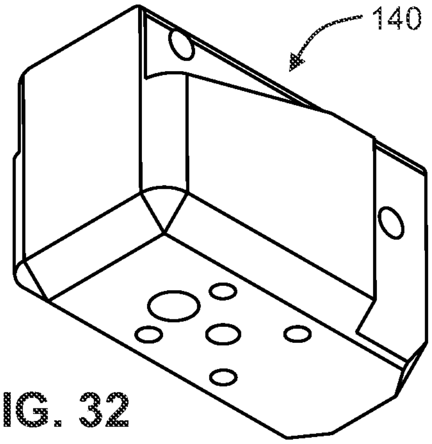
FIG. 32 is a further diagrammatic perspective view of the example porting block of FIG. 29.
Figure 33:
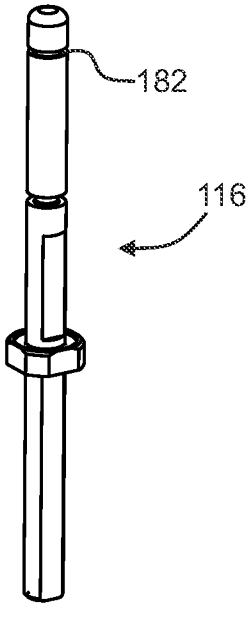
FIG. 33 is a diagrammatic perspective view of one example valve trigger pin.
Figure 34:
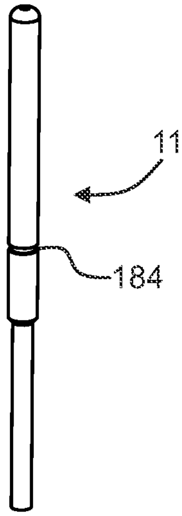
FIG. 34 is a diagrammatic perspective view of one example vent trigger pin.
Figure 35:
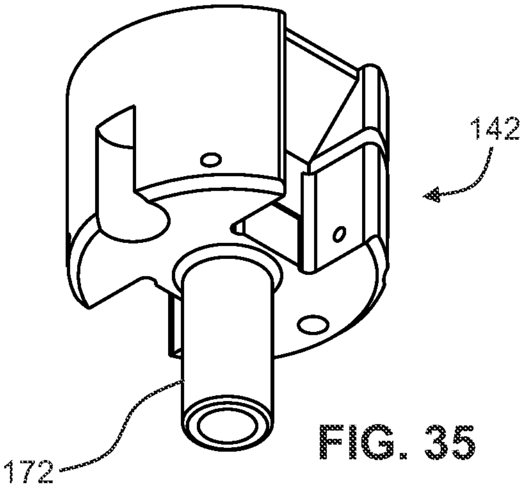
FIG. 35 is a diagrammatic perspective view of one example stem block.
Figure 36:
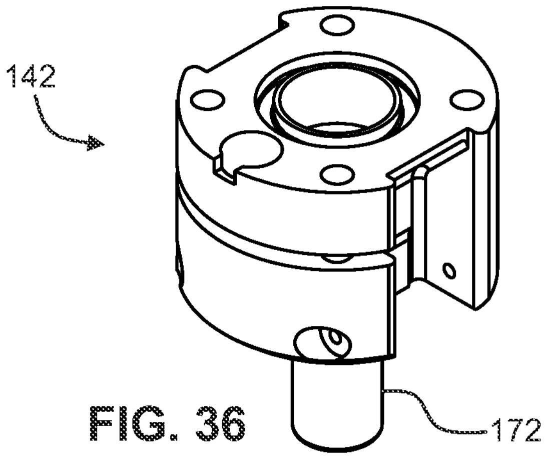
FIG. 36 is a further diagrammatic perspective view of the stem block of FIG. 35.
Figure 37:
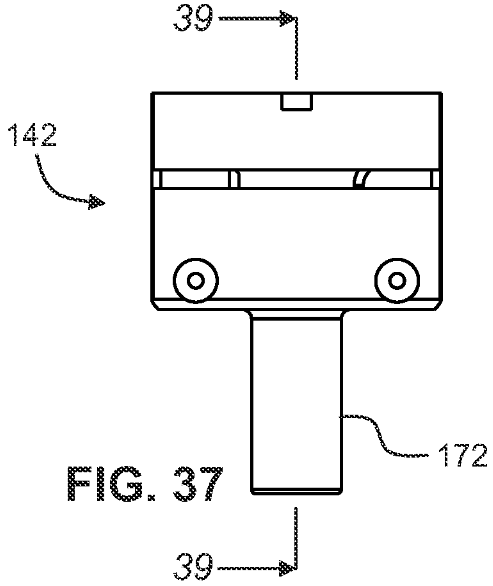
FIG. 37 is a diagrammatic side view of the stem block of FIG. 35.
Figure 38:
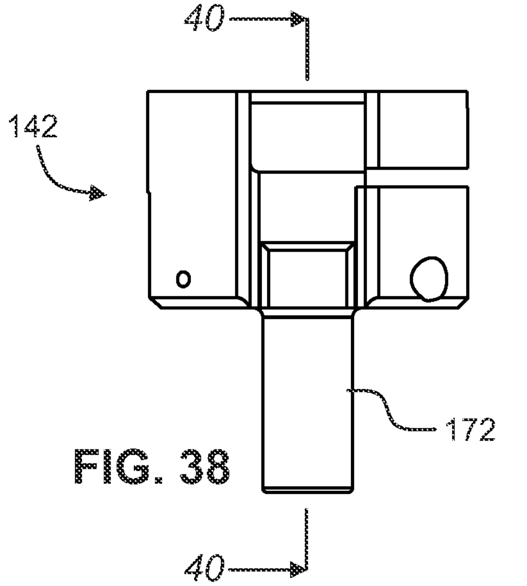
FIG. 38 is a further diagrammatic side view of the stem block of FIG. 35, showing the side opposite to that shown in FIG. 37.
Figure 39:
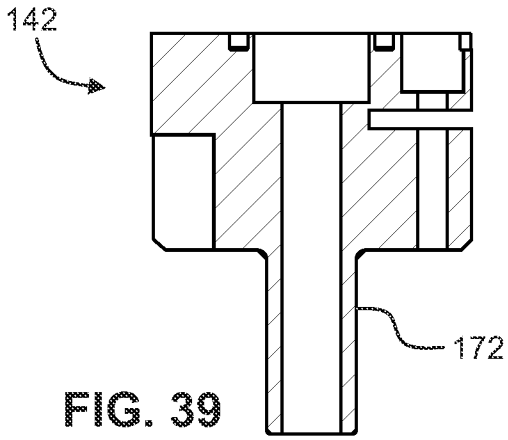
FIG. 39 is a diagrammatic cross-sectional view taken along lines 39-39 of FIG. 37.
Figure 40:
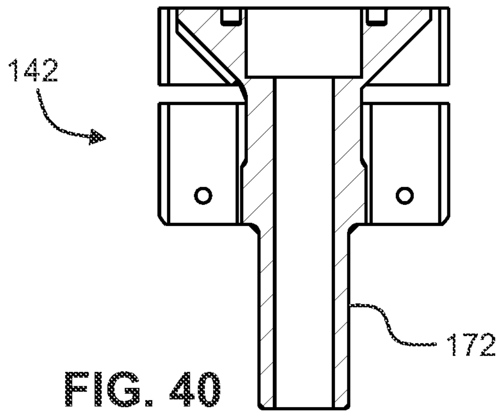
FIG. 40 is a diagrammatic cross-sectional view taken along lines 40-40 of FIG. 38.
Figure 41:
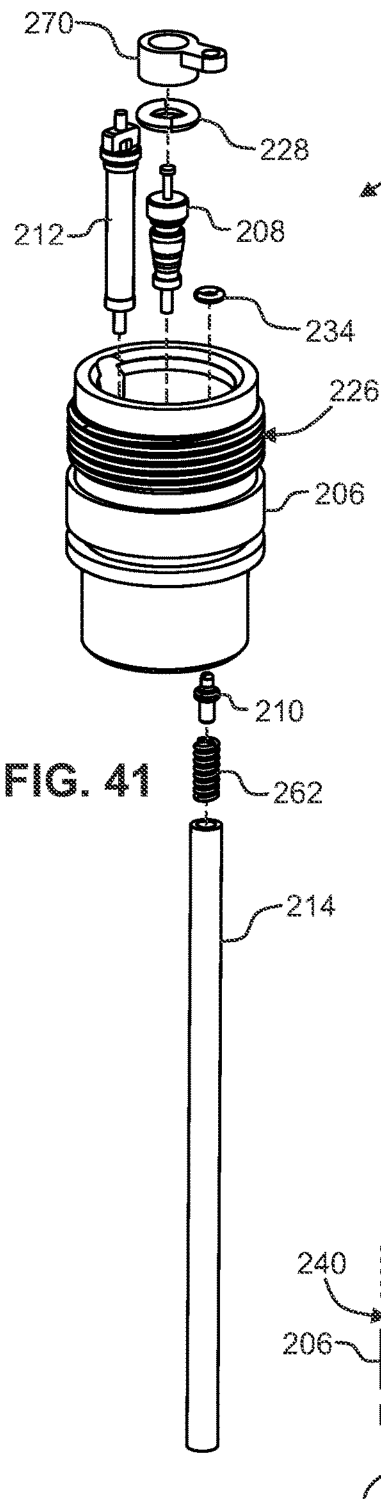
FIG. 41 is a diagrammatic exploded view of one alternate example of a valve assembly.
Figure 42:
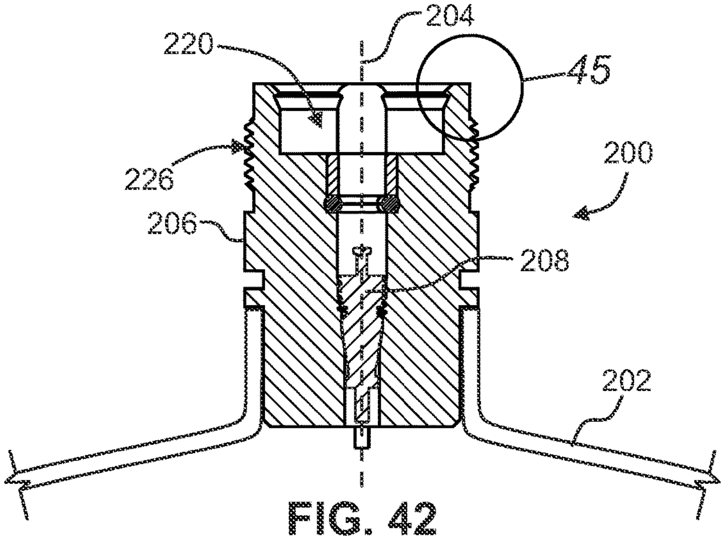
FIG. 42 is a diagrammatic cross-sectional view of the valve assembly of FIG. 41, but wherein the valve assembly is assembled and affixed within the neck of a pressure vessel.
Figure 43:
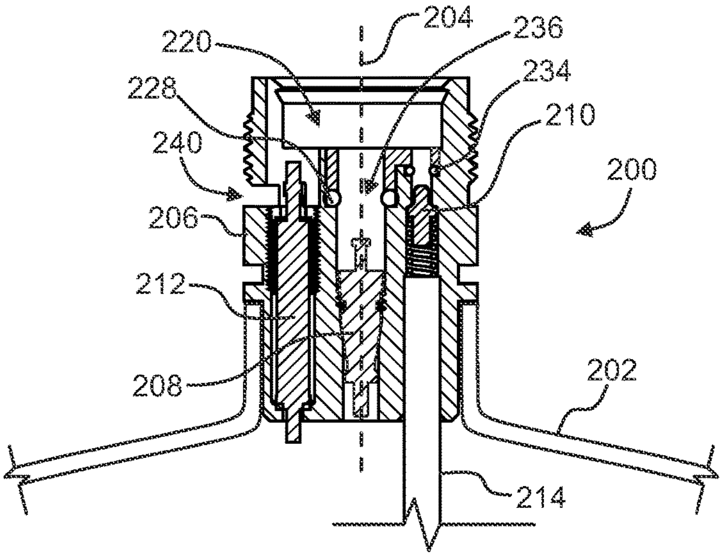
FIG. 43 is a diagrammatic cross-sectional view of the valve assembly of FIG. 41, but wherein the cross-section is taken orthogonally to that shown in FIG. 42.
Figure 44:
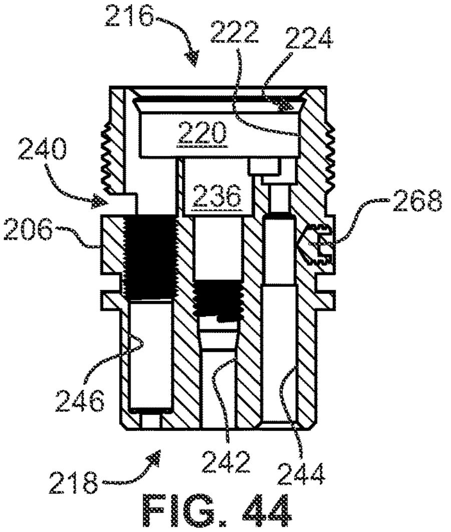
FIG. 44 is a diagrammatic cross-sectional view of the valve housing of the valve assembly of FIG. 41.
Figure 45:
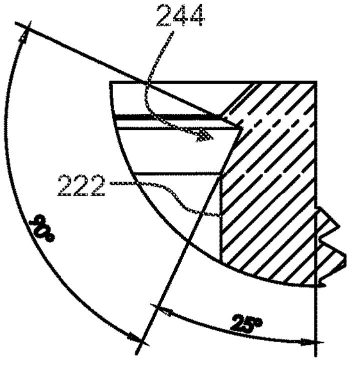
FIG. 45 is a magnified view of detail 45 in FIG. 42, illustrating one non-limiting example of a securement groove in a radially-inward-facing wall of the valve housing.
Figure 46:
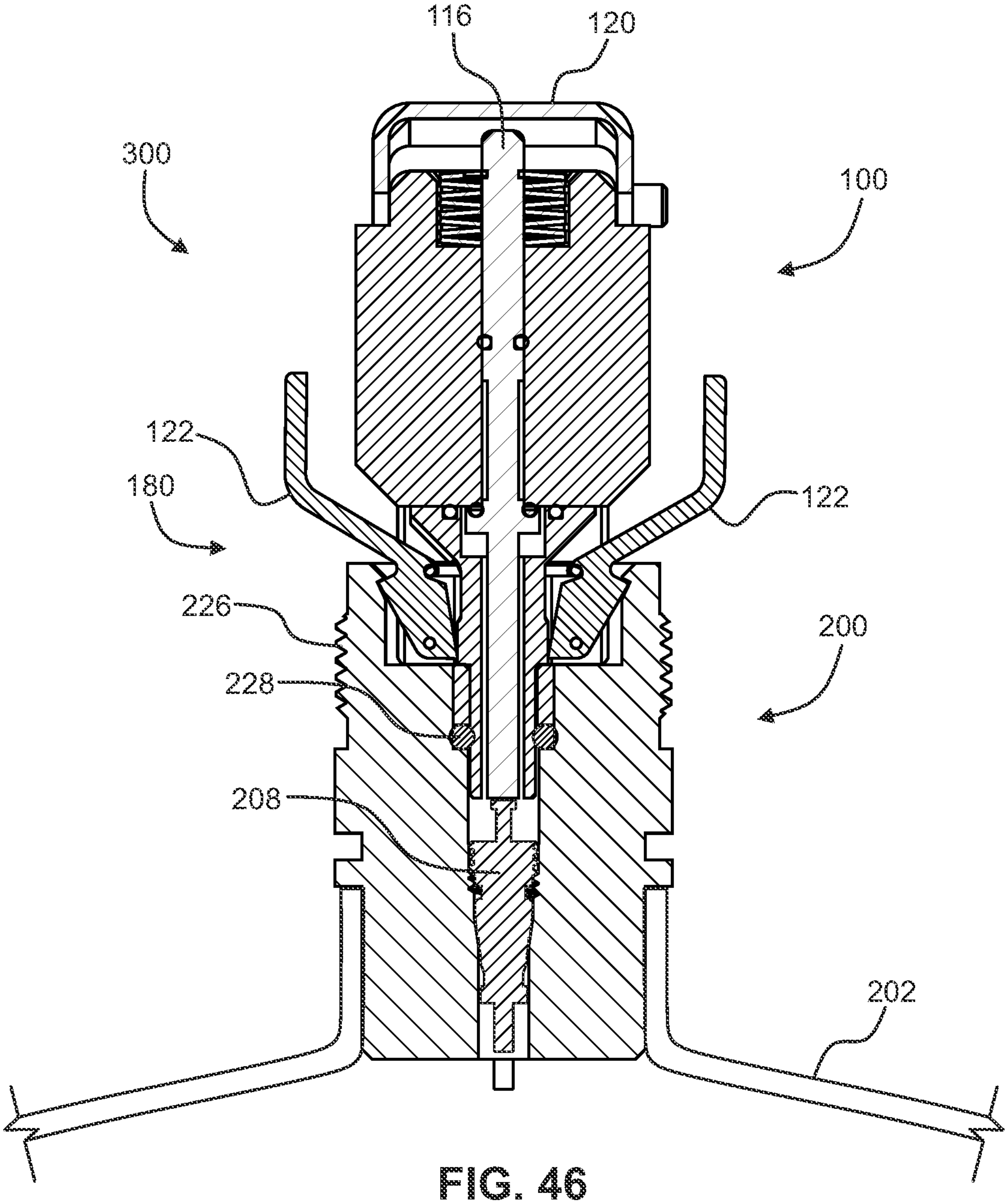
FIG. 46 is a diagrammatic cross-sectional view similar to that of FIG. 20, but wherein the quick-fill apparatus is shown attached to the alternate valve assembly of FIG. 43, with the lip engagement portions of the valve lock elements shown engaging a securement groove of the valve assembly receptacle chamber.
Figure 47:
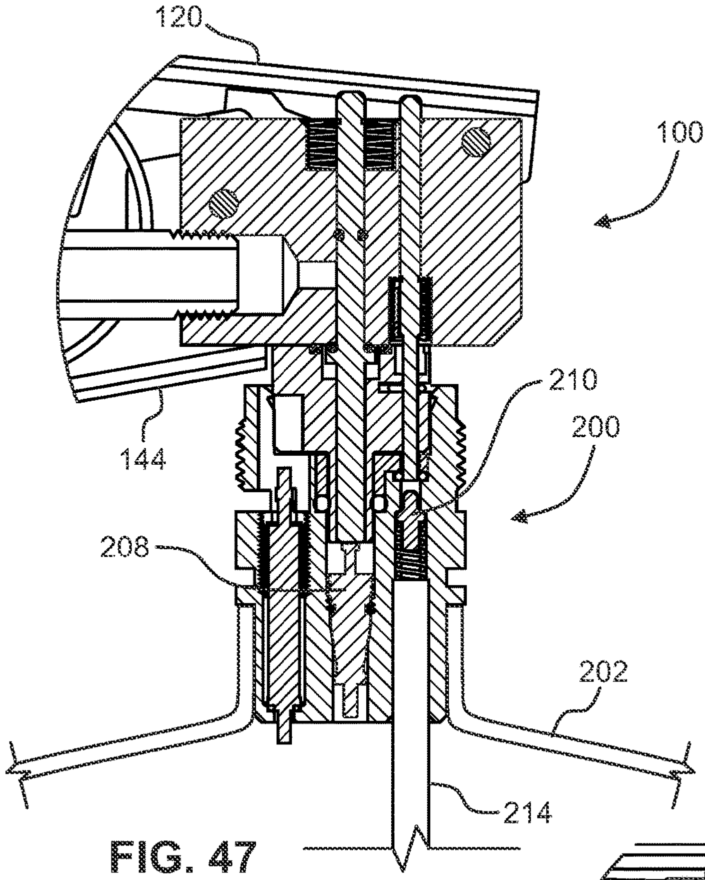
FIG. 47 is a magnified view similar to that of FIG. 27, but wherein the quick-fill system incorporates the alternate valve assembly shown in FIG. 43.
Figure 48:
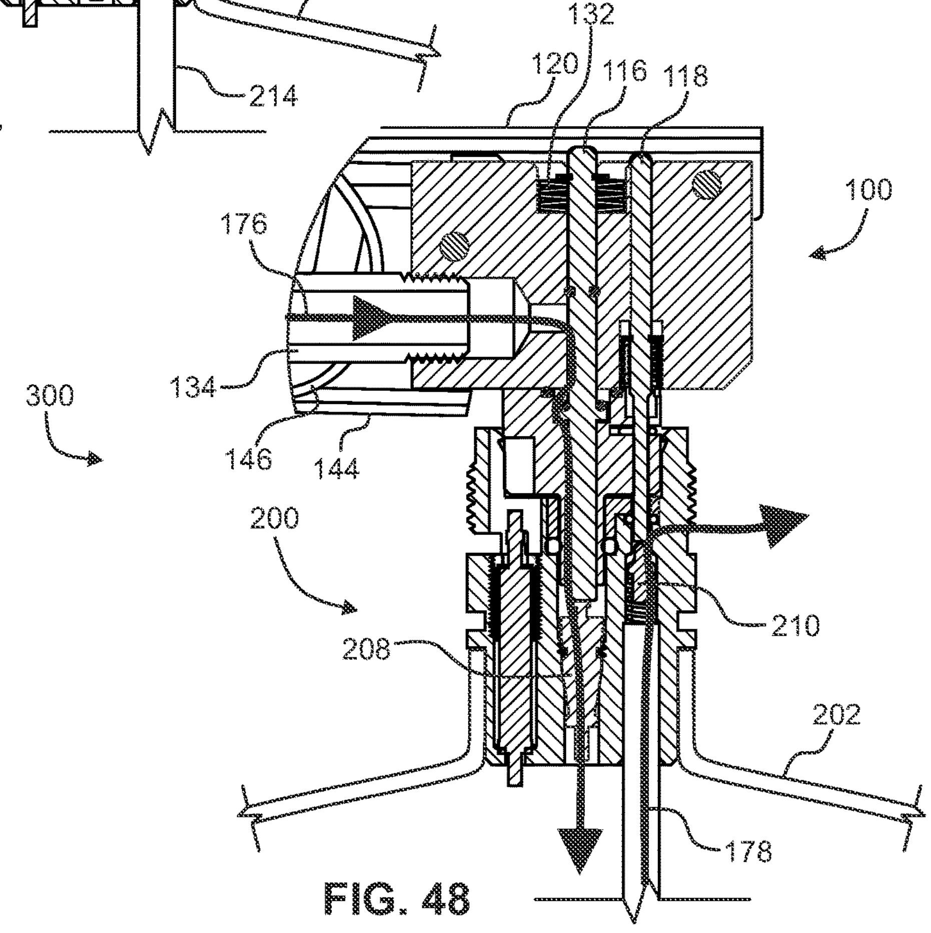
FIG. 48 is a magnified view similar to that of FIG. 47, but showing the handle element moved to its on position, thereby forcing the valve trigger pin to its valve activation position and the vent trigger pin to its vent activation position so as to allow fuel to flow into the vessel from the fuel supply.

Referring to FIG. 15, a valve assembly 200 may comprise a valve housing 206, a fill valve 208, an overfill valve pin 210, a dip tube 214, and an overpressure relieve valve 212. The valve housing 206 may extend along a valve axis 204 from an adaptor end 216 to a vessel end 218. The valve housing 206 may include a receptacle chamber 220, a fill valve socket 242, an overfill socket 244 and an overpressure socket 246. The fill valve 208 is disposed within the fill valve socket 242, and is movable between an open configuration (see, e.g., FIGS. 28 and 48) and a closed configuration (see, e.g., FIGS. 27 and 47). The overfill valve pin 210 is disposed within the overfill socket 244 and is movable between a fluid sealing position (see, e.g., FIGS. 27 and 47) and a fluid venting configuration (see, e.g., FIGS. 28 and 48). The dip tube 214 may be in fluid communication with the overfill socket 244. The overpressure relief valve 212 is disposed within the overpressure socket 246. The receptacle chamber 220 may be disposed in fluid communication between the adaptor end 216 and both the fill valve 208 and the overfill valve pin 210. The receptacle chamber may also include a radially-inward-facing wall 222 with a securement groove 224 therein. Referring to FIG. 17, a securement lip 272 may be defined between the securement groove 224 and the adaptor end 216. The securement groove 224 may extend partially circumferentially or entirely circumferentially about the radially-inward-facing wall 222.

Referring again to FIG. 15, certain preferred examples of the valve assembly 200 may comprise an overpressure upper seal 230 affixed in fluid-sealing communication between the overpressure relief valve 212 and the receptacle chamber 220. This configuration allows the quick-fill apparatus 100 to provide fuel to the vessel 202 through the valve assembly 200, without requiring a seal between the valve body 206 and the quick-fill apparatus 100 to prevent pressurized gas from escaping from the overpressure relief valve 212 through the receptacle chamber 220.

Figure 51:
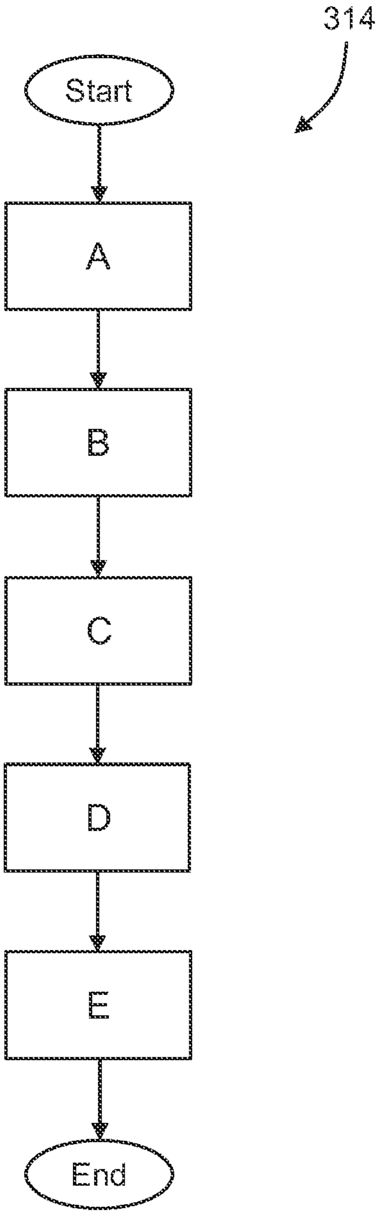
FIG. 51 is block diagram representing one example of a method of filling a pressure vessel with fuel by way of a valve assembly in accordance with the present disclosure.

Referring to FIG. 51, one example of a method of filling a pressure vessel 202 with fuel by way of a valve assembly 200 is shown at 314. At block A of FIG. 51, a valve assembly 200 is selected. Referring to FIG. 15, the valve assembly 200 may have a valve housing 206, a fill valve 208, a dip tube 214, and an overfill valve pin 210. The valve housing 206 may have an adaptor end 216 and a vessel end 218 opposite thereof. A receptacle chamber 220 may be defined at the adaptor end 216. The fill valve 208 may be movable between a closed configuration and an open configuration. The overfill valve pin 210 may be movable between a fluid sealing position and a fluid venting configuration.

At block B of the method 314 in FIG. 51, a quick-fill apparatus is provided. Referring to FIGS. 1-3, the quick-fill apparatus 100 may comprise a body portion 102, a valve trigger pin 116, a vent trigger pin 118, a valve securement mechanism 180, and a handle element 120. The body portion 102 may have a valve engagement end 104, a fuel supply port 114 and a valve trigger bore 110. The valve trigger bore 110 may extend through the valve engagement end 104 along a main axis 108. The fuel supply port 114 may be in fluid communication with the valve trigger bore 110. The valve trigger pin may extend through the valve trigger bore and may be transportable between a valve activation position and a valve deactivation position. The vent trigger pin may be transportable between a vent activation position and a vent deactivation position. The valve securement mechanism may be configured to releasably secure the valve engagement end within the receptacle chamber. The handle element may be movable with respect to the body portion between an on position and an off position. Movement of the handle element to the on position preferably forces the valve trigger pin to the valve activation position and the vent trigger pin to the vent activation position. Movement of the handle element to the off position preferably allows the valve trigger pin to return to the valve deactivation position and preferably allows the vent trigger pin to return to the vent deactivation position. The handle element is preferably resiliently biased toward the off position.

At block C of the method 314 in FIG. 51, and also referring to FIG. 20, the valve engagement end 104 is inserted into the receptacle chamber 220. At block D At block C of the method 314 in FIG. 51, and also referring to FIG. 20, the valve engagement end 104 is secured within the receptacle chamber 220 (e.g. within the stem compartment 236 of the receptacle chamber 220) by way of the valve securement mechanism 180. At block E, and also referring to FIGS. 28 and 48, the handle element 120 is moved to the on position, thereby causing (a) the valve trigger pin 116 to force the fill valve 208 to the open configuration; (b) fuel to flow from the fuel supply port 114 into the pressure vessel 202 (e.g., via fuel supply flow path 176); and (c) the vent trigger pin 118 to force the overfill valve pin 210 to the fluid venting configuration, thereby allowing excess fuel to escape the pressure vessel 200 (e.g., via overfill vent flow path 178). In particular implementations of the method 314, the flow of fuel is by way of gravity fill. In certain implementations of the method 314, the flow of fuel is by way of pressure differential between the pressure vessel and a fuel supply.

In particular implementations of the method 314, the valve securement mechanism may include a first valve lock element and a second valve lock element. Each valve lock element may have a lip engagement portion and a grip portion, and may be actuatable with respect to the body portion between a lock position and an unlock position. Each valve lock element may be elastically biased toward the lock position. At block C, during the step of inserting, the valve lock elements may be actuated toward their unlock positions, thereby moving the lip engagement portions radially inward toward the main axis. At block D, during the step of securing, the valve lock elements may be allowed to return toward their lock positions whereby the lip engagement portions engage a securement groove disposed on a radially-inward-facing wall of the receptacle chamber.

The following listing matches certain terminology used within this disclosure with corresponding reference numbers used in the non-limiting examples illustrated in the several figures.

100 quick-fill apparatus
102 body portion
104 valve engagement end
106 opposing end
108 main axis
110 valve trigger bore
112 vent trigger bore
114 fuel supply port
116 valve trigger pin
118 vent trigger pin
120 handle element
122 valve lock element
124 lip engagement portion (of valve lock element)
126 grip portion (of valve lock element)
128 handle pivot axis
130 lock pivot axis
132 valve pin spring (e.g., conical disc washers; e.g., Belville stack)
134 fill tube
136 radial direction outward of main axis
138 first tube relief channel (of handle element)
140 porting block
142 stem block
144 lockout element
146 lockout spring
148 second tube relief channel (of lockout element)
150 lock spring (e.g., extension spring)
152 block seal element (e.g., o-ring)
154 block fastener (e.g., threaded; e.g., socket head cap screw)
156 first valve trigger seal (e.g., o-ring)
158 second valve trigger seal (e.g., o-ring)
160 valve trigger retention element (e.g., side-mount retaining ring)
162 vent trigger spring (e.g., compression spring)
164 vent trigger retention element (e.g., side-mount retaining ring)
166 handle dowel pin
168 lockout dowel pin
170 valve lock dowel pin
172 stem portion (of stem block)
174 securement sleeve

176 fuel supply flow path
178 overfill vent flow path
180 valve securement mechanism
182 valve trigger pin clip slot
184 vent trigger pin clip slot
186 handle detent
188 detent relief
190 overpressure relief flow path
192 fuel delivery flow path
200 valve assembly
202 pressure vessel
204 valve axis
206 valve housing
208 fill valve (e.g., poppet or Schrader valve)
210 overfill valve pin
212 overpressure relief valve
214 dip tube
216 adaptor end
218 vessel end
220 receptacle chamber
222 radially-inward facing wall (of receptacle chamber)
224 securement groove
226 threaded portion (of valve housing)
228 stem seal (e.g., o-ring)
230 overpressure upper seal (e.g., o-ring)
232 overfill lower seal (e.g., gasket)
234 overfill upper seal (e.g., o-ring)
236 stem compartment (part of the receptacle chamber)
238 overfill vent port
240 overpressure exhaust port
242 fill valve socket
244 overfill socket
246 overpressure socket
248 overpressure lower seal
250 overpressure spring
252 dip seat
254 o-ring seat
256 fill valve spring
258 fill valve seal
260 seal retainer
262 overfill valve spring
264 overpressure exhaust chamber
266 epoxy (e.g., Loctite E-60HP)
268 overfill bleed screw
270 seal retainer
272 securement lip
300 quick-fill system (quick-fill apparatus combined with valve assembly)
302 fuel supply (e.g., gravity-feeding or pressure-feeding)
304 fuel supply conduit (e.g., flexible tubing)
306 fuel (e.g., propane, butane, etc.)
308 ambient environment
310 valve connection adaptor (e.g., CGA600-type)
312 fuel-consuming device (e.g., BBQ grill or heater)
314 method While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A quick-fill apparatus for use with a valve assembly, the apparatus comprising:

a body portion having a valve engagement end, a fuel supply port, a valve trigger bore and a vent trigger bore, the valve trigger bore extending through the valve engagement end along a main axis, the fuel supply port being in fluid communication with the valve trigger bore, the valve engagement end being configured to be inserted into a receptacle chamber of a valve assembly;

a valve trigger pin extending through the valve trigger bore and being transportable between a valve activation position and a valve deactivation position;

a vent trigger pin extending through the vent trigger bore and being transportable between a vent activation position and a vent deactivation position;

a valve securement mechanism configured to releasably secure the valve engagement end within the receptacle chamber; and a handle element movable with respect to the body portion between an on position and an off position;

wherein, (i) movement of the handle element to the on position forces the valve trigger pin to the valve activation position and the vent trigger pin to the vent activation position;

(ii) movement of the handle element to the off position allows the valve trigger pin to return to the valve deactivation position and allows the vent trigger pin to return to the vent deactivation position;

(iii) the handle element is resiliently biased toward the off position;

(iv) the transportability of the valve trigger pin and the vent trigger pin are both in parallel with the main axis; and (v) the valve trigger bore and the vent trigger bore each extend entirely through the body portion in parallel with the main axis.

2. A quick-fill apparatus as defined in claim 1, wherein (a) the valve trigger pin is resiliently biased toward the valve deactivation position; and (b) the vent trigger pin is resiliently biased toward the vent deactivation position.

3. A quick-fill apparatus as defined in claim 1, wherein (a) the valve securement mechanism includes a first valve lock element and a second valve lock element, each valve lock element having a lip engagement portion and a grip portion and being actuatable with respect to the body portion between a lock position and an unlock position, each valve lock element being elastically biased toward the lock position; and (b) actuation of the valve lock elements toward the unlock position results in movement of the lip engagement portions radially inward toward the main axis.

4. A quick-fill apparatus as defined in claim 3, wherein the lip engagement portions are configured to engage a securement groove disposed on a radially-inward-facing wall of the receptacle chamber when the valve lock elements are in the lock position.

5. A quick-fill apparatus as defined in claim 1, wherein (a) the valve securement mechanism includes a first valve lock element and a second valve lock element, each valve lock element having a lip engagement portion and a grip portion and being actuatable with respect to the body portion between a lock position and an unlock position, each valve lock element being elastically biased toward the lock position;

(b) actuation of the valve lock elements toward the unlock position results in movement of the lip engagement portions radially of the main axis; and (c) the valve lock elements are laterally opposed from one another on opposite sides radially of the main axis.

6. A quick-fill apparatus as defined in claim 5, wherein the actuatability of each valve lock element is about a lock pivot axis which is perpendicular to the main axis.

7. A quick-fill apparatus as defined in claim 6, wherein the movability of the handle element is about a handle pivot axis which is perpendicular to the main axis and the lock pivot axis.

8. A quick-fill apparatus as defined in claim 1, wherein
(a) the valve trigger pin is resiliently biased toward the valve deactivation position by a valve trigger pin spring; and
(b) the resilient bias of the handle element toward the off position is at least partially by way of the valve trigger pin spring.

9. A quick-fill apparatus as defined in claim 1, wherein the valve securement mechanism includes a securement sleeve rotatable about the main axis with respect to the body portion, the securement sleeve being configured to threadedly engage a threaded portion of a valve housing of the valve assembly.

10. A quick-fill apparatus as defined in claim 1 further comprising a fill tube configured to be secured in fluid supplying communication with the fuel supply port, the fill tube being rigid,
wherein the fill tube and the handle element are elongated and extend in a shared radial direction outward of the main axis.

11. A quick-fill apparatus as defined in claim 10, wherein the handle element includes a first tube relief channel configured to at least partially receive the fill tube when the handle element is in the on position.

12. A quick-fill apparatus as defined in claim 1, wherein the body portion is comprised of a porting block and a stem block.

13. A quick-fill apparatus for use with a valve assembly, the apparatus comprising:
a body portion having a valve engagement end, a fuel supply port and a valve trigger bore, the valve trigger bore extending through the valve engagement end along a main axis, the fuel supply port being in fluid communication with the valve trigger bore, the valve engagement end being configured to be inserted into a receptacle chamber of a valve assembly;
a valve trigger pin extending through the valve trigger bore and being transportable between a valve activation position and a valve deactivation position;
a vent trigger pin transportable between a vent activation position and a vent deactivation position;
a valve securement mechanism configured to releasably secure the valve engagement end within the receptacle chamber;
a handle element movable with respect to the body portion between an on position and an off position; and
a lockout element movable between a handle locking position and a handle releasing position;
wherein
(i) movement of the handle element to the on position forces the valve trigger pin to the valve activation position and the vent trigger pin to the vent activation position;
(ii) movement of the handle element to the off position allows the valve trigger pin to return to the valve deactivation position and allows the vent trigger pin to return to the vent deactivation position;
(iii) the handle element is resiliently biased toward the off position;

(iv) the handle element is moveable from the off position to the on position when the lockout element is in the handle releasing position; and
(v) the handle element is prevented from moving from the off position to the on position when the lockout element is in the handle locking position.

14. A quick-fill apparatus as defined in claim 13, wherein the lockout element is resiliently biased toward the handle locking position.

15. A quick-fill apparatus as defined in claim 14, wherein the resilient bias of the lockout element is lower than the resilient bias of the handle element.

16. A quick-fill apparatus as defined in claim 15, wherein the resilient biases of the lockout element and the handle element are provided at least in part by a lockout spring disposed therebetween.

17. A quick-fill apparatus as defined in claim 16, wherein
(a) the handle element includes a first tube relief channel configured to at least partially receive the fill tube when the handle element is in the on position; and
(b) the lockout element includes a second tube relief channel configured to at least partially receive the fill tube when the lockout element is in the handle releasing position.

18. A method of filling a pressure vessel with fuel by way of a valve assembly, the method comprising:
selecting a valve assembly having a valve housing, a fill valve, a dip tube, and an overfill valve pin, the valve housing having an adaptor end and a vessel end opposite thereof, a receptacle chamber being defined at the adaptor end, the fill valve being movable between a closed configuration and an open configuration, the overfill valve pin being movable between a fluid sealing position and a fluid venting configuration;
providing a quick-fill apparatus comprising
(a) a body portion having a valve engagement end, a fuel supply port and a valve trigger bore, the valve trigger bore extending through the valve engagement end along a main axis, the fuel supply port being in fluid communication with the valve trigger bore;
(b) a valve trigger pin extending through the valve trigger bore and being transportable between a valve activation position and a valve deactivation position;
(c) a vent trigger pin transportable between a vent activation position and a vent deactivation position;
(d) a valve securement mechanism configured to releasably secure the valve engagement end within the receptacle chamber
a handle element movable with respect to the body portion between an on position and an off position;
wherein,
(i) movement of the handle element to the on position forces the valve trigger pin to the valve activation position and the vent trigger pin to the vent activation position;
(ii) movement of the handle element to the off position allows the valve trigger pin to return to the valve deactivation position and allows the vent trigger pin to return to the vent deactivation position; and
(iii) the handle element is resiliently biased toward the off position;
inserting the valve engagement end into the receptacle chamber;
securing the valve engagement end within the receptacle chamber by way of the valve securement mechanism; and moving the handle element to the on position, thereby causing (a) the valve trigger pin to force the fill valve to the open configuration;

(b) fuel to flow from the fuel supply port into the pressure vessel; and (c) the vent trigger pin to force the overfill valve pin to the fluid venting configuration.

19. A method as defined in claim 18, wherein the flow of fuel is by way of gravity fill.

20. A method as defined in claim 18, wherein the flow of fuel is by way of pressure differential between the pressure vessel and a fuel supply.

21. A method as defined in claim 18, wherein the valve securement mechanism includes a first valve lock element and a second valve lock element, each valve lock element having a lip engagement portion and a grip portion and being actuatable with respect to the body portion between a lock position and an unlock position, each valve lock element being elastically biased toward the lock position;

during the step of inserting, actuating the valve lock elements toward their unlock positions, thereby moving the lip engagement portions radially inward toward the main axis; and during the step of securing, allowing the valve lock elements to return toward their lock positions whereby the lip engagement portions engage a securement groove disposed on a radially-inward-facing wall of the receptacle chamber.

* * * * *